(12) United States Patent
Fan

(10) Patent No.: US 12,463,733 B2
(45) Date of Patent: Nov. 4, 2025

(54) CHANNEL MEASUREMENT METHOD AND APPARATUS

(71) Applicant: Huawei Technologies Co., Ltd., Shenzhen (CN)

(72) Inventor: Bo Fan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 327 days.

(21) Appl. No.: 18/059,686

(22) Filed: Nov. 29, 2022

(65) Prior Publication Data

US 2023/0125760 A1   Apr. 27, 2023

Related U.S. Application Data

(63) Continuation of application No. PCT/CN2021/096796, filed on May 28, 2021.

(30) Foreign Application Priority Data

May 30, 2020   (CN) .......................... 202010480698.7

(51) Int. Cl.
*H04B 17/309* (2015.01)
*H04B 7/0456* (2017.01)
(Continued)

(52) U.S. Cl.
CPC ......... *H04B 17/309* (2015.01); *H04B 7/0456* (2013.01); *H04B 7/0478* (2013.01);
(Continued)

(58) Field of Classification Search
CPC .. H04B 17/309; H04B 7/0456; H04B 17/382; H04B 7/063; H04B 7/0478;
(Continued)

(56) References Cited

U.S. PATENT DOCUMENTS

2012/0307729 A1   12/2012  Selén et al.
2013/0343301 A1*  12/2013  Geirhofer ............. H04L 5/0057
                                                         370/329

(Continued)

FOREIGN PATENT DOCUMENTS

CN    102143096 A    8/2011
CN    102546110 A    7/2012
(Continued)

OTHER PUBLICATIONS

3rd Generation Partnership Project; Technical Specification Group Radio Access Network; NR; Physical channels and modulation (Release 15), 3GPP TS 38.211, Mar. 2019, 96 Pages, V15.5.0.
(Continued)

*Primary Examiner* — Tejis Daya
(74) *Attorney, Agent, or Firm* — Slater Matsil, LLP

(57) ABSTRACT

This application provides a channel measurement method and apparatus. The method includes: receiving measurement configuration information from a network device, and performing joint channel measurement based on the measurement configuration information, where the measurement configuration information is used to configure one or more groups of measurement resources, each group of measurement resources includes a plurality of measurement resources, and the group of measurement resources is used to perform joint channel measurement once.

20 Claims, 5 Drawing Sheets

(51) Int. Cl.
    *H04B 17/382*    (2015.01)
    *H04L 5/00*      (2006.01)
    *H04W 24/08*     (2009.01)

(52) U.S. Cl.
    CPC ......... *H04B 17/382* (2015.01); *H04L 5/0051* (2013.01); *H04W 24/08* (2013.01)

(58) Field of Classification Search
    CPC .. H04B 7/0639; H04B 7/0486; H04B 7/0632; H04B 17/345; H04B 7/024; H04L 5/0051; H04L 5/0023; H04L 5/0048; H04L 5/0094; H04W 24/08; H04W 24/10
    See application file for complete search history.

(56) References Cited

U.S. PATENT DOCUMENTS

| | | | |
|---|---|---|---|
| 2017/0318516 | A1 | 11/2017 | Huang et al. |
| 2019/0109626 | A1 | 4/2019 | Park et al. |
| 2019/0335474 | A1 | 10/2019 | Tang et al. |
| 2019/0379506 | A1 | 12/2019 | Cheng |
| 2020/0119795 | A1* | 4/2020 | Zhang ............... H04B 7/0626 |
| 2021/0021318 | A1* | 1/2021 | Li ..................... H04L 5/0005 |
| 2021/0258060 | A1 | 8/2021 | Gao et al. |
| 2021/0314043 | A1* | 10/2021 | Hao .................. H04B 7/0417 |
| 2021/0410160 | A1* | 12/2021 | Guo ................... H04W 72/21 |
| 2022/0038154 | A1* | 2/2022 | Wang ................ H04L 5/0035 |
| 2023/0246785 | A1* | 8/2023 | Grossmann ........ H04L 5/0057 370/329 |
| 2023/0262503 | A1* | 8/2023 | Liu .................... H04W 24/10 370/252 |

FOREIGN PATENT DOCUMENTS

| | | |
|---|---|---|
| CN | 108282212 A | 7/2018 |
| CN | 108810932 A | 11/2018 |
| CN | 109151887 A | 1/2019 |
| CN | 113259051 B | 5/2023 |
| EP | 3200497 A1 | 8/2017 |
| EP | 3425817 A1 | 1/2019 |
| WO | 2016047505 A1 | 3/2016 |

OTHER PUBLICATIONS

3rd Generation Partnership Project; Technical Specification Group Radio Access Network; NR; Multiplexing and channel coding (Release 15), 3GPP TS 38.212, Mar. 2019, 101 Pages, V15.5.0.

3rd Generation Partnership Project; Technical Specification Group Radio Access Network; NR; Physical layer procedures for control (Release 15), 3GPP TS 38.213, Mar. 2019, 104 Pages, V15.5.0.

3rd Generation Partnership Project; Technical Specification Group Radio Access Network; NR; Physical layer procedures for data (Release 15), 3GPP TS 38.214, Mar. 2019, 103 Pages, V15.5.0.

3rd Generation Partnership Project; Technical Specification Group Radio Access Network; NR; Physical layer procedures for data (Release 16), 3GPP TS 38.214, Mar. 2020, 151 Pages, V16.1.0.

3rd Generation Partnership Project; Technical Specification Group Radio Access Network; NR; Radio Resource Control (RRC) protocol specification (Release 16), 3GPP TS 38.331, Mar. 2020, 835 Pages, V16.0.0.

3rd Generation Partnership Project; Technical Specification Group Radio Access Network; NR; Radio Resource Control (RRC) protocol specification (Release 15), 3GPP TS 38.331, Mar. 2019, 491 Pages, V15.5.0.

Huawei et al., "Remaining issues for CSI framework", 3GPP TSG RAN WG1 Meeting #91, R1-1719426, Nov. 27-Dec. 1, 2017, 8 pages, Reno, USA.

Huawei et al., "On aperiodic CSI-RS triggering", 3GPP TSG RAN WG1 Meeting #91, R1-1719813, Nov. 27-Dec. 1, 2017, 5 Pages, Reno, USA.

\* cited by examiner

CHANNEL MEASUREMENT METHOD AND APPARATUS

CROSS-REFERENCE TO RELATED APPLICATIONS

This application is a continuation of International Application No. PCT/CN2021/096796, filed on May 28, 2021, which claims priority to Chinese Patent Application No. 202010480698.7, filed on May 30, 2020. The disclosures of the aforementioned applications are hereby incorporated by reference in their entireties.

TECHNICAL FIELD

This application relates to the field of communication technologies, and in particular, to a channel measurement method and apparatus.

BACKGROUND

In a mobile communication system (for example, 5th generation (5G)), before data transmission, channel measurement needs to be performed to obtain channel information. A main method for channel measurement is as follows: A network device configures a reference signal for a terminal device, and sends configuration information of the reference signal to the terminal device. The terminal device receives and measures the reference signal, and feeds back a measurement result to the network device.

Currently, a network side may transmit data for the terminal device by using different transmission mechanisms. For example, for a terminal device located in a cell center, the network side may transmit data for the terminal device based on a single transmission and reception point (TRP); for a terminal device located at a cell edge, the network side may transmit data for the terminal device based on a plurality of TRPs. Data transmission based on a plurality of TRPs may be referred to as coordinated multipoint transmission/reception (CoMP). During coordinated multipoint transmission/reception, channel measurement needs to be performed on a joint channel including the plurality of TRPs. To be specific, the terminal device needs to measure reference signals sent by the plurality of TRPs, to determine channel quality of the joint channel including the plurality of TRPs. However, currently, there is no method for measuring the joint channel.

SUMMARY

This application provides a channel measurement method and apparatus, to measure a joint channel.

According to a first aspect, an embodiment of this application provides a channel measurement method. The method may be applied to a terminal device, or a chip or a chip set in the terminal device. The method includes: receiving measurement configuration information from a network device, where the measurement configuration information is used to configure one or more groups of measurement resources, each group of measurement resources includes a plurality of measurement resources, and the group of measurement resources is used to perform joint channel measurement once; and performing the joint channel measurement based on the measurement configuration information.

In this embodiment of this application, the network device configures a plurality of measurement resources for a joint channel, and different beam directions may be configured for different measurement resources, so that channel measurement on the joint channel can be implemented.

In a possible design, the measurement resource may be a channel resource, or may be an interference resource.

In a possible design, for each group of measurement resources, the measurement configuration information further indicates that the measurement resources included in the group of measurement resources are used for joint channel measurement. According to the foregoing design, the terminal device may distinguish between a measurement resource used for separate measurement and a measurement resource used for joint channel measurement, to improve accuracy of joint channel measurement.

In a possible design, when the measurement configuration information meets at least one of the following conditions, the measurement configuration information indicates that the measurement resources included in each group of measurement resources are used to perform joint channel measurement:

the measurement configuration information includes a first parameter, and the first parameter indicates that a channel measurement manner is joint channel measurement;

the measurement configuration information includes a second parameter, the second parameter indicates a quantity of measurement resources used for joint channel measurement, and a value of the second parameter is greater than 1;

the measurement resources included in each group of measurement resources are included in a plurality of resource sets;

the measurement configuration information includes a plurality of resource sets, and one resource set is used as one group of measurement resources;

an interference resource type is an NZP CSI-RS, and a quantity of channel resources is greater than 1; and the measurement configuration information includes reporting configuration information, and the reporting configuration information indicates that a codebook type for reporting a measurement result is a first codebook type.

In the foregoing design, a direct or indirect manner indicates that the measurement resources included in each group of measurement resources are used to perform joint channel measurement, so that the terminal device can distinguish between the measurement resource used for separate measurement and the measurement resource used for joint channel measurement, to improve accuracy of joint channel measurement.

In a possible design, the performing joint channel measurement based on the measurement configuration information includes: determining a plurality of precoding matrices based on the plurality of measurement resources included in each group of measurement resources, where the plurality of measurement resources are in one-to-one correspondence with the plurality of precoding matrices.

In a possible design, the performing joint channel measurement based on the measurement configuration information includes: determining one precoding matrix based on the plurality of measurement resources included in each group of measurement resources.

In a possible design, after joint channel measurement is performed based on the measurement configuration information, a measurement result corresponding to each group of measurement resources may be further reported. The measurement result includes a precoding matrix determined based on the group of measurement resources. For example, the measurement result includes one precoding matrix determined based on the group of measurement resources. For another example, the measurement result includes a plurality of precoding matrices determined based on the group of measurement resources.

In a possible design, the measurement result may further include an index corresponding to the group of measurement resources.

In a possible, when the plurality of precoding matrices are determined based on the plurality of measurement resources included in each group of measurement resources, for each measurement resource in each group of measurement resources, a precoding matrix corresponding to the measurement resource may be determined. When the precoding matrix corresponding to the measurement resource is determined, a measurement resource other than the measurement resource in the group of measurement resources is used as an interference resource. According to the foregoing manner, inter-stream interference during multi-stream transmission may be reduced, so that a transmission capacity can be increased.

In a possible design, the measurement configuration information further indicates that a joint measurement manner is Manner 1 or Manner 2, Manner 1 is determining one precoding matrix based on the plurality of measurement resources included in each group of measurement resources, and Manner 2 is determining a plurality of precoding matrices based on the plurality of measurement resources included in each group of measurement resources. The foregoing design provides two joint measurement manners, and the terminal device performs channel measurement in one of the manners, to improve accuracy of joint channel measurement.

In a possible design, the plurality of precoding matrices have different priorities. According to the foregoing design, when reporting resources are insufficient, the terminal device may preferentially report a precoding matrix with a high priority.

In a possible design, when the measurement result corresponding to each group of measurement resources is reported, the measurement result may be reported based on the priorities of the plurality of precoding matrices.

In a possible design, a priority of a precoding matrix is positively correlated with a resource index of a measurement resource corresponding to the precoding matrix. For example, a larger resource index of a measurement resource corresponding to a precoding matrix indicates a higher priority of the precoding matrix.

In a possible design, a priority of a precoding matrix is positively correlated with a configuration ranking of a measurement resource corresponding to the precoding matrix. For example, a higher configuration ranking of a measurement resource corresponding to a precoding matrix indicates a higher priority of the precoding matrix.

In a possible design, a priority of a precoding matrix is positively correlated with a ranking of a measurement resource corresponding to the precoding matrix in a resource set. For example, a higher ranking of a measurement resource corresponding to a precoding matrix in a resource set indicates a higher priority of the precoding matrix.

In a possible design, the measurement configuration information further indicates that the codebook type is a second codebook type, and the second codebook type includes a parameter set corresponding to each measurement resource in each group of measurement resources, and a phase difference between any two measurement resources. The foregoing design provides a new codebook type. The codebook type is applicable to joint channel measurement. Using the codebook type when the terminal device reports the measurement result may improve reporting accuracy.

In a possible design, the measurement resource is a channel resource; and the measurement configuration information is further used to configure the interference resource, where the interference resource includes one or more channel state information interference measurement (CSI-IM) resources, one CSI-IM resource is associated with one group of measurement resources, and the CSI-IM resource has a same quasi-collocation (QCL) relationship with the associated measurement resources. In the foregoing design, a QCL relationship between the channel resource and the interference resource is stipulated, so that the terminal device can accurately measure the interference resource, to improve accuracy of joint channel measurement.

In a possible design, the measurement resource is a channel resource; and the measurement configuration information is further used to configure the interference resource, where the interference resource includes one or more non-zero-power channel state information reference signal (NZP CSI-RS) resources, one group of measurement resources is associated with at least one NZP CSI-RS resource, and the at least one NZP CSI-RS resource has a same QCL relationship with the associated measurement resources.

In a possible design, one group of measurement resources may be configured in one resource set, or a plurality of groups of measurement resources may be configured in one resource set.

In a possible design, the measurement configuration information may meet the following constrained conditions: If a measurement type is separate measurement and a reported codebook type is a type II codebook, a quantity of measurement resources included in the measurement configuration information is not greater than 1; if a measurement type is joint measurement and a reported codebook type is a type II codebook, a quantity of measurement resources included in the measurement configuration information is allowed to be greater than 1.

In a possible design, the measurement configuration information may meet the following constrained conditions: If a measurement type is separate measurement, measurement resources in one resource set have equal frequency-domain densities, and equal port quantities; if a measurement type is joint measurement, measurement resources in one resource set may have equal or unequal frequency domain densities, and equal or unequal port quantities.

In a possible design, the measurement configuration information may meet the following constrained conditions: If a measurement type is separate measurement, and an interference resource whose type is an NZP CSI-RS is configured, a quantity of channel resources configured in the measurement configuration information is not greater than 1; if a measurement type is joint measurement, and an interference resource whose type is an NZP CSI-RS is configured, a quantity of channel resources configured in the measurement configuration information is allowed to be greater than 1.

In a possible design, the method further includes: The terminal device determines a used codebook based on a bit, where a bitmap indicates whether a base of each precoding matrix is available; or a bitmap indicates an available base in bases of all precoding matrices.

According to a second aspect, an embodiment of this application provides a channel measurement method. The method may be applied to a network device, or a chip or a chip set in the network device. The method includes: sending measurement configuration information to a terminal device, where the measurement configuration information is used to configure one or more groups of measurement resources, each group of measurement resources includes a plurality of measurement resources, and the group of measurement resources is used to perform joint channel measurement once; and sending, based on the measurement configuration information, reference signals corresponding to the one or more groups of measurement resources.

In this embodiment of this application, the network device configures a plurality of measurement resources for a joint channel, and different beam directions may be configured for different measurement resources, so that channel measurement on the joint channel can be implemented.

In a possible design, the measurement resource may be a channel resource, or may be an interference resource.

In a possible design, for each group of measurement resources, the measurement configuration information further indicates that the measurement resources included in the group of measurement resources are used for joint channel measurement. According to the foregoing design, the terminal device may distinguish between a measurement resource used for separate measurement and a measurement resource used for joint channel measurement, to improve accuracy of joint channel measurement.

In a possible design, when the measurement configuration information meets at least one of the following conditions, the measurement configuration information indicates that the measurement resources included in each group of measurement resources are used to perform joint channel measurement:

the measurement configuration information includes a first parameter, and the first parameter indicates that a channel measurement manner is joint channel measurement;

the measurement configuration information includes a second parameter, the second parameter indicates a quantity of measurement resources used for joint channel measurement, and a value of the second parameter is greater than 1;

the measurement resources included in each group of measurement resources are included in a plurality of resource sets;

the measurement configuration information includes a plurality of resource sets, and one resource set is used as one group of measurement resources;

an interference resource type is an NZP CSI-RS, and a quantity of channel resources is greater than 1; and the measurement configuration information includes reporting configuration information, and the reporting configuration information indicates that a codebook type for reporting a measurement result is a first codebook type.

In the foregoing design, a direct or indirect manner indicates that the measurement resources included in each group of measurement resources are used to perform joint channel measurement, so that the terminal device can distinguish between the measurement resource used for separate measurement and the measurement resource used for joint channel measurement, to improve accuracy of joint channel measurement.

In a possible design, the measurement configuration information further indicates that a joint measurement manner is Manner 1 or Manner 2. Manner 1 is determining one precoding matrix based on the plurality of measurement resources included in each group of measurement resources, and Manner 2 is determining a plurality of precoding matrices based on the plurality of measurement resources included in each group of measurement resources, where the plurality of measurement resources are in one-to-one correspondence with the plurality of precoding matrices. The foregoing design provides two joint measurement manners, and the terminal device performs channel measurement in one of the manners, to improve accuracy of joint channel measurement.

In a possible design, after the reference signals corresponding to the one or more groups of measurement resources are sent based on the measurement configuration information, a measurement result that corresponds to each group of measurement resources and that is reported by the terminal device may be further received. The measurement result includes a precoding matrix determined based on the group of measurement resources. For example, the measurement result includes one precoding matrix determined based on the group of measurement resources. For another example, the measurement result includes a plurality of precoding matrices determined based on the group of measurement resources.

In a possible design, the measurement result may further include an index corresponding to the group of measurement resources.

In a possible design, the plurality of precoding matrices have different priorities. According to the foregoing design, when reporting resources are insufficient, the terminal device may preferentially report a precoding matrix with a high priority.

In a possible design, a priority of a precoding matrix is positively correlated with a resource index of a measurement resource corresponding to the precoding matrix. For example, a larger resource index of a measurement resource corresponding to a precoding matrix indicates a higher priority of the precoding matrix.

In a possible design, a priority of a precoding matrix is positively correlated with a configuration ranking of a measurement resource corresponding to the precoding matrix. For example, a higher configuration ranking of a measurement resource corresponding to a precoding matrix indicates a higher priority of the precoding matrix.

In a possible design, a priority of a precoding matrix is positively correlated with a ranking of a measurement resource corresponding to the precoding matrix in a resource set. For example, a higher ranking of a measurement resource corresponding to a precoding matrix in a resource set indicates a higher priority of the precoding matrix.

In a possible design, the measurement configuration information further indicates that the codebook type is a second codebook type, and the second codebook type includes a parameter set corresponding to each measurement resource in each group of measurement resources, and a phase difference between any two measurement resources. The foregoing design provides a new codebook type. The codebook type is applicable to joint channel measurement. Using the codebook type when the terminal device reports the measurement result may improve reporting accuracy.

In a possible design, the measurement resource is a channel resource; and the measurement configuration information is further used to configure an interference resource, where the interference resource includes one or more channel state information interference measurement (CSI-IM) resources, one CSI-IM resource is associated with one group of measurement resources, and the CSI-IM resource has a same quasi-collocation (QCL) relationship with the associated measurement resources. In the foregoing design, a QCL relationship between the channel resource and the interference resource is stipulated, so that the terminal device can accurately measure the interference resource, to improve accuracy of joint channel measurement.

In a possible design, the measurement resource is a channel resource; and the measurement configuration information is further used to configure an interference resource, where the interference resource includes one or more non-zero-power channel state information reference signal (NZP CSI-RS) resources, one group of measurement resources is associated with at least one NZP CSI-RS resource, and the at least one NZP CSI-RS resource has a same QCL relationship with the associated measurement resources.

In a possible design, one group of measurement resources may be configured in one resource set, or a plurality of groups of measurement resources may be configured in one resource set.

In a possible design, the measurement configuration information may meet the following constrained conditions: If a measurement type is separate measurement and a reported codebook type is a type II codebook, a quantity of measurement resources included in the measurement configuration information is not greater than 1; if a measurement type is joint measurement and a reported codebook type is a type II codebook, a quantity of measurement resources included in the measurement configuration information is allowed to be greater than 1.

In a possible design, the measurement configuration information may meet the following constrained conditions: If a measurement type is separate measurement, measurement resources in one resource set have equal frequency-domain densities, and equal port quantities; if a measurement type is joint measurement, measurement resources in one resource set may have equal or unequal frequency domain densities, and equal or unequal port quantities.

In a possible design, the measurement configuration information may meet the following constrained conditions: If a measurement type is separate measurement, and an interference resource whose type is an NZP CSI-RS is configured, a quantity of channel resources configured in the measurement configuration information is not greater than 1; if a measurement type is joint measurement, and an interference resource whose type is an NZP CSI-RS is configured, a quantity of channel resources configured in the measurement configuration information is allowed to be greater than 1.

According to a third aspect, this application provides a channel measurement apparatus. The apparatus may be a communication device, or may be a chip or a chip set in the communication device. The communication device may be a terminal device or a network device. The apparatus may include a processing module and a transceiver module. When the apparatus is a communication device, the processing module may be a processor, and the transceiver module may be a transceiver. The apparatus may further include a storage module, and the storage module may be a memory. The storage module is configured to store instructions. The processing module executes the instructions stored in the storage module, so that the terminal device performs a corresponding function in the first aspect; or the processing module executes the instructions stored in the storage module, so that the network device performs a corresponding function in the second aspect. When the apparatus is a chip or a chip set in a communication device, the processing module may be a processor. The transceiver module may be an input/output interface, a pin, a circuit, or the like. The processing module executes instructions stored in the storage module, so that the terminal device performs a corresponding function in the first aspect; or the processing module executes instructions stored in the storage module, so that the network device performs a corresponding function in the second aspect. The storage module may be a storage module (for example, a register or a cache) in the chip or the chip set, or may be a storage module (for example, a read-only memory or a random access memory) outside the chip or the chip set in the base station.

According to a fourth aspect, a channel measurement apparatus is provided, and includes a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the channel measurement method according to any design in the first aspect or the second aspect.

According to a fifth aspect, an embodiment of this application provides a communication apparatus. The communication apparatus includes a processor; and when the processor executes a computer program or instructions in a memory, the method according to the first aspect is performed.

According to a sixth aspect, an embodiment of this application provides a communication apparatus. The communication apparatus includes a processor; and when the processor executes a computer program or instructions in a memory, the method according to the second aspect is performed.

According to a seventh aspect, an embodiment of this application provides a communication apparatus. The communication apparatus includes a processor and a memory. The memory is configured to store a computer program or instructions, and the processor is configured to execute the computer program or the instructions stored in the memory, so that the communication apparatus performs the corresponding method shown in the first aspect.

According to an eighth aspect, an embodiment of this application provides a communication apparatus. The communication apparatus includes a processor and a memory. The memory is configured to store a computer program or computer-executable instructions, and the processor is configured to execute the computer program or the computer-executable instructions stored in the memory, so that the communication apparatus performs the corresponding method shown in the second aspect.

According to a ninth aspect, an embodiment of this application provides a communication apparatus. The communication apparatus includes a processor, a memory, and a transceiver. The transceiver is configured to receive a signal or send a signal, the memory is configured to store program code or instructions, and the processor is configured to invoke the program code or the instructions from the memory to perform the method according to the first aspect.

According to a tenth aspect, an embodiment of this application provides a communication apparatus. The communication apparatus includes a processor, a memory, and a transceiver. The transceiver is configured to receive a signal or send a signal, the memory is configured to store program code or instructions, and the processor is configured to invoke the program code or the instructions from the memory to perform the method according to the second aspect.

According to an eleventh aspect, an embodiment of this application provides a communication apparatus. The communication apparatus includes a processor and an interface circuit. The interface circuit is configured to receive computer program code or instructions and transmit the computer program code or the instructions to the processor. The processor runs the computer program code or the instructions to perform the corresponding method shown in the first aspect.

According to a twelfth aspect, an embodiment of this application provides a communication apparatus. The communication apparatus includes a processor and an interface circuit. The interface circuit is configured to receive computer program code or instructions and transmit the computer program code or the instructions to the processor. The processor runs the computer program code or the instructions to perform the corresponding method shown in the second aspect.

According to a thirteenth aspect, an embodiment of this application provides a computer-readable storage medium. The computer-readable storage medium is configured to store computer program code or instructions. When the computer program code or the instructions are executed, the method in the first aspect is implemented.

According to a fourteenth aspect, an embodiment of this application provides a computer-readable storage medium. The computer-readable storage medium is configured to store computer program code or instructions. When the computer program code or the instructions are executed, the method in the second aspect is implemented.

According to a fifteenth aspect, an embodiment of this application provides a computer program product including computer program code or instructions. When the computer program code or the instructions are executed, the method in the first aspect is implemented.

According to a sixteenth aspect, an embodiment of this application provides a computer program product including computer program code or instructions. When the computer program code or the instructions are executed, the method in the second aspect is implemented.

DETAILED DESCRIPTION OF ILLUSTRATIVE EMBODIMENTS

1. Beam

Figure 1:
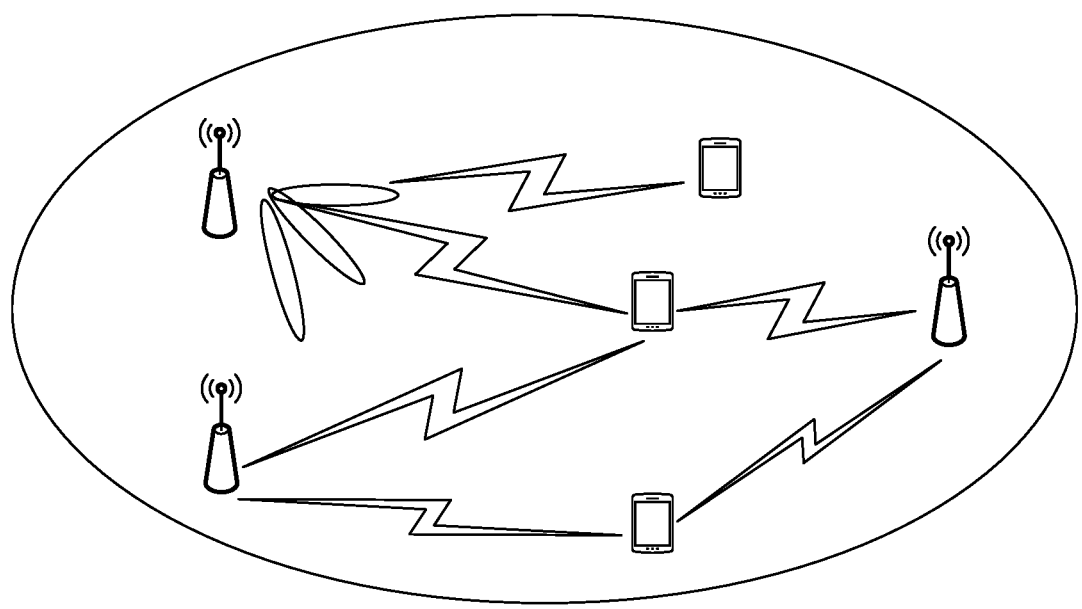
FIG. 1 is a schematic diagram of an architecture of a communication system according to an embodiment of this application.

The beam in a new radio (NR) protocol may be embodied as a spatial domain filter that is also referred to as a spatial filter or a spatial parameter (for example, a spatial reception parameter and a spatial transmission parameter). A beam used to send a signal may be referred to as a transmission beam (Tx beam), or may be referred to as a spatial domain transmission filter, a spatial transmission filter, a spatial domain transmission parameter, or a spatial transmission parameter. A beam used to receive a signal may be referred to as a reception beam (Rx beam), or may be referred to as a spatial domain reception filter, a spatial reception filter, a spatial domain reception parameter, or a spatial reception parameter.

The transmission beam may refer to distribution of signal strength formed in different directions in space after a signal is transmitted through an antenna, and the reception beam may refer to distribution of signal strength, in different directions in space, of a radio signal received from an antenna.

In addition, the beam may be a wide beam, a narrow beam, or a beam of another type. A beamforming technology may be another technology. The beamforming technology may be specifically a digital beamforming technology, an analog beamforming technology, a hybrid digital/analog beamforming technology, or the like.

The beam usually corresponds to a resource. For example, during beam measurement, a network device measures different beams by using different resources, a terminal device feeds back measured resource quality, and the network device knows quality of a corresponding beam. During data transmission, beam information is also indicated by using a corresponding resource. For example, the network device indicates information about a physical downlink shared channel (PDSCH) beam of the terminal device by using a resource in a transmission configuration indicator (TCI) of downlink control information (DCI).

Optionally, a plurality of beams that have same or similar communication features may be considered as one beam. One beam may include one or more antenna ports, configured to transmit a data channel, a control channel, a sounding signal, and the like. The one or more antenna ports forming the beam may also be considered as one antenna port set.

During downlink beam measurement, the transmission beam is a transmission beam of the network device, and the reception beam may be a reception beam of the terminal device. During uplink beam measurement, the transmission beam is a transmission beam of the terminal device, and the reception beam may be a reception beam of the network device. During beam measurement, one beam may correspond to one resource. In this manner, an index of the resource may be used to identify the beam corresponding to the resource. Alternatively, one beam may correspond to a plurality of resources.

2. Quasi-Collocation (QCL)

Quasi-collocation may also be referred to as quasi co-site or co-location.

Signals corresponding to antenna ports having a QCL relationship may have a same or similar spatial characteristic parameter (or referred to as a parameter), or a spatial characteristic parameter (or referred to as a parameter) of one antenna port may be used to determine a spatial characteristic parameter (or referred to as a parameter) of another antenna port that has a QCL relationship with the antenna port, or two antenna ports have a same or similar spatial characteristic parameter (or referred to as a parameter), or a difference between spatial characteristic parameters (or referred to as parameters) of two antenna ports is less than a threshold.

It should be understood that spatial characteristic parameters of two reference signals or channels that meet a QCL relationship are the same (close or similar), so that a spatial characteristic parameter of the target reference signal can be inferred based on a resource index of the source reference signal.

It should be further understood that spatial characteristic parameters of two reference signals or channels that meet spatial correlation information are the same (close or similar), so that a spatial characteristic parameter of the target reference signal can be inferred based on a resource index of the source reference signal.

The spatial characteristic parameter includes one or more of the following parameters:

an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, transmission beamforming of the terminal device, reception beamforming of the terminal device, spatial channel correlation, transmission beamforming of the network device, reception beamforming of the network device, an average channel gain, an average delay, delay spread, Doppler spread, a Doppler shift, a spatial reception parameter, or the like.

The foregoing angles may be decomposition values at different dimensions or a combination of decomposition values at different dimensions.

Four types of QCL are defined in an existing standard, and the network device may simultaneously configure one or more types of QCL for the terminal device, for example, QCL types A+D, and QCL types C+D:

QCL type A: Doppler shift, Doppler spread, average delay, and delay spread

QCL type B: Doppler shift and Doppler spread

QCL type C: Average delay and Doppler shift

QCL type D: Spatial Rx parameter

When the QCL relationship is a QCL relationship of the type D, the QCL relationship may be considered as spatial QCL. When antenna ports meet the spatial QCL relationship, the QCL relationship may be a QCL relationship (which may also be referred to as the spatial relation) between a port for a downlink signal and a port for a downlink signal or a QCL relationship between a port for an uplink signal and a port for an uplink signal, and may be that the two signals may have a same AoA or AoD, to indicate that the two signals have a same reception beam or transmission beam. For another example, a QCL relationship between a downlink signal and an uplink signal or between a port for an uplink signal and a port for a downlink signal may be that there is a correspondence between AoAs and AoDs of the two signals, or that there is a correspondence between AoDs and AoAs of the two signals. To be specific, beam reciprocity may be used to determine an uplink transmission beam based on a downlink reception beam or determine a downlink reception beam based on an uplink transmission beam.

Signals transmitted on ports having a spatial QCL relationship may alternatively be understood as signals received or sent by using a same spatial filter. The spatial filter may be at least one of the following: precoding, a weight of an antenna port, a phase deflection of the antenna port, or an amplitude gain of the antenna port.

Signals transmitted on ports having a spatial QCL relationship may alternatively be understood as having corresponding beam pair links (BPLs). The corresponding BPLs include at least one of the following: a same downlink BPL, a same uplink BPL, an uplink BPL corresponding to a downlink BPL, or a downlink BPL corresponding to an uplink BPL.

Therefore, the spatial reception parameter (namely, the QCL of the type D) may be understood as a parameter indicating direction information of a reception beam.

In an example of this application, correspondences of some parameters may also be used in descriptions of a QCL scenario.

It should be understood that this application is applicable to a QCL assumption scenario in which two reference signals, or transmission objects may have an association relationship.

3. Measurement Resource

A measurement resource corresponding to a channel may be an uplink measurement resource, or may be a downlink measurement resource. The uplink measurement resource includes but is not limited to a sounding reference signal (SRS), a demodulation reference signal (DMRS), and the like. The downlink measurement resource includes but is not limited to a channel state information reference signal (CSI-RS), channel state information interference measurement (CSI-IM), a cell-specific reference signal (CS-RS), a UE-specific reference signal (US-RS), a DMRS, an SS/PBCH block, and the like. The SS/PBCH block may be referred to as a synchronization signal block (SSB) for short.

The measurement resource may be configured by using radio resource control (RRC) signaling. In a configuration structure, one measurement resource may be one data structure, including a related parameter of an uplink/downlink signal corresponding to the measurement resource, for example, a type of the uplink/downlink signal, a resource element that carries the uplink/downlink signal, sending time and a sending periodicity of the uplink/downlink signal, and a quantity of ports used to send the uplink/downlink signal. A measurement resource of each uplink/downlink signal has an index, to identify the measurement resource of the uplink/downlink signal. It may be understood that the index of the measurement resource may also be referred to as an identifier of the measurement resource. This is not limited in embodiments of this application.

The measurement resource may include a channel resource and an interference resource.

3.1. Channel Resource

The channel resource is a resource that is configured by the network device and that is used for channel measurement. The channel resource may be used to measure channel information such as a reference signal received power (RSRP), a channel quality indicator (CQI), and a signal to interference plus noise ratio (SINR). During uplink channel measurement, the channel resource may be an SRS resource. During downlink channel measurement, the channel resource may be a CSI-RS resource or an SSB. During CQI and SINR measurement, an interference resource also need to be configured.

3.2. Interference Resource

The interference resource is a resource that is configured by the network device and that is used for channel measurement. During uplink channel measurement, the interference resource may be an SRS resource. During downlink channel measurement, the interference resource may be a CSI-RS resource, an SSB, or a CSI-IM resource. When channel information such as a CQI and an SINR is measured, these interference resources are used as interference sources to calculate the CQI and the SINR together with the channel resource. For example, when an SINR of one channel resource in one interference resource needs to be measured, energy of the channel resource may be used as a numerator, and energy of the interference resource may be used as a denominator, to calculate the SINR.

4. Channel Measurement

Channel measurement is a measurement procedure in the R15 protocol, and is used to measure channel state information, for example, a CQI, of a specific resource. Channel measurement is classified into downlink channel measurement and uplink channel measurement.

4.1 Downlink Channel Measurement

Downlink channel measurement mainly includes four steps.

S1: The network device sends measurement configuration information to the terminal device. The measurement configuration information is sent by the network device to the terminal by using radio resource control (RRC) signaling, and mainly includes two parts: resource configuration information and reporting configuration information. The resource configuration information is information related to a measurement resource, and is configured by using a three-level structure in the protocol: resource configuration (resourceConfig) or resource setting (resourceSetting)-resource set (resourceSet)-resource. The network device may configure one or more resource configurations for the terminal device. Each resource configuration includes one or more resource sets, and each resource set may include one or more resources. Each resource configuration/resource set/resource includes an index, and further includes some other parameters, for example, a periodicity of the resource and a signal class corresponding to the resource. Each resource may include one or more antenna ports. The reporting configuration information is information related to reporting of a measurement result, and is configured through reporting configuration (ReportConfig) in the protocol. The network device may configure one or more reporting configurations for the terminal device. Each reporting configuration includes reporting-related information such as a reporting indicator, reporting time, a reporting periodicity, and a reporting format. In addition, the reporting configuration further includes the index of the resource configuration, to indicate a measurement configuration by which a reported result is measured.

During channel measurement, when a CQI needs to be measured, a corresponding interference signal may be further measured. The interference signal may be measured by measuring an interference resource. The interference resource and a channel resource are configured for the terminal device together, and are respectively configured in different resource settings. For example, two resource settings are configured in RRC signaling, where one resource setting includes the channel resource, and the other resource setting includes the interference resource. There are two types of interference resources: a non-zero-power channel state information reference signal (NZP CSI-RS) and CSI-IM.

Beam information of each resource further needs to be configured. In this way, the terminal device knows a beam corresponding to each resource, and determines a reception beam that should be used for receiving. The beam information is encapsulated in a TCI-state, and each channel resource may include one TCI-state, indicating beam information of the resource. Beam information of the interference resource does not need to be configured, and beam information of the channel resource associated with the interference resource is used by default. For example, when a CSI-IM resource is used as the interference resource, a quantity of CSI-IM resources needs to be equal to a quantity of channel resources, and the CSI-IM resources are in one-to-one correspondence with the channel resources. For each CSI-IM resource, a beam of a channel resource corresponding to the CSI-IM resource is used by default, and the terminal device receives the channel resource and the CSI-IM resource by using a same reception beam. When an NZP CSI-RS resource is used as the interference resource, it is stipulated that only one channel resource can be configured, and a beam of the channel resource is used for all NZP CSI-RS interference resources.

The following describes specific formats of the resource configuration and the reporting configuration in the R15 protocol, to facilitate understanding of the measurement configuration information.

<Definition of the resource configuration: The resource configuration includes one or more resource sets, and one resource set includes one or more resources>

CSI-ResourceConfig::=SEQUENCE {
<Index of the resource configuration>
csi-ResourceConfigId CSI-ResourceConfigId,
<The resource configuration includes a resource set list, where the resource set list may be a list of nzp-CSI-RS-SSB resource sets or a list of csi-IM resource sets>
csi-RS-ResourceSetList CHOICE {
<The list of the nzp-CSI-RS-SSB resource sets includes a plurality of nzp-CSI-RS resource sets or a plurality of csi-SSB resource sets, or both. Each nzp-CSI-RS resource set includes one or more nzp-CSI-RS resources, and each csi-SSB resource set includes one or more csi-SSB resources>
nzp-CSI-RS-SSB-ResourceSetList SEQUENCE {
nzp-CSI-RS-ResourceSetList SEQUENCE (SIZE (1 . . . maxNrofNZP-CSI-RS-ResourceSetsPerConfig)) OF
NZP-CSI-RS-ResourceSetId
csi-SSB-ResourceSetList SEQUENCE (SIZE (1 . . . maxNrofCSI-SSB-ResourceSetsPerConfig)) OF CSI-SSB-ResourceSetId
},
<The list of the csi-IM resource sets includes a plurality of csi-IM resource sets, and each csi-IM resource set includes one or more csi-IM resources>
csi-IM-ResourceSetList SEQUENCE (SIZE (1 . . . maxNrofCSI-IM-ResourceSetsPerConfig)) OF CSI-IM-ResourceSetId
},
<A frequency of one cell is divided into a plurality of bandwidth blocks, and bwp-id indicates an identifier of the bandwidth block>
bwp-Id BWP-Id,
<Time domain sending feature of a resource in the resource configuration:
periodic sending, semi-persistent sending, or aperiodic sending>
resourceType ENUMERATED {aperiodic, semiPersistent, periodic},
. . .
<The resource set includes one or more resources, the nzp-CSI-RS resource set includes one or more nzp-CSI-RS resources, the csi-SSB resource set includes one or more SSB resources, and the csi-IM resource set includes one or more csi-IM resources. Because there are many types of resource sets, the resource sets are not described here one by one>
}

```
<Definition of the reporting configuration, where some
    parameters irrelevant to this patent are omitted>
CSI-ReportConfig::=SEQUENCE {
    <Index of the reporting configuration>
    reportConfigId CSI-ReportConfigId,
    <Identifier of a resource configuration used to measure
        channel information>
    resourcesForChannelMeasurement CSI-ResourceCon-
        figId,
    <Identifier of a resource configuration used to measure
        interference information, where resource types
        included in the resource configuration each are csi-
        IM>
    csi-IM-ResourcesForInterference    CSI-ResourceCon-
        figId
    <Identifier of a resource configuration used to measure
        interference information, where resource types
        included in the resource configuration each are nzp-
        CSI-RS>
    nzp-CSI-RS-ResourcesForInterference         CSI-Re-
        sourceConfigId
    <Reported parameters, such as an RSRP and a CQI>
    reportQuantity CHOICE {
        ...
    },
    <A group-based reporting rule may be configured as
        enabled or disabled>
    groupBasedBeamReporting CHOICE {
        <When the rule is configured as enabled, other
            details do not need to be further configured, and
            the UE reports two resource identifiers CRIs or
            SSBRIs that can be received simultaneously>
        enabled NULL,
        <When the rule is configured as disabled, a quantity
            of beams to be specifically reported needs to be
            further set, and may be set to 1 to 4. For example,
            when the quantity is set to 4, the UE reports four
            resource identifiers, and the four resource identi-
            fiers are not required to be received simultane-
            ously>
        disabled SEQUENCE {
            nrofReportedRS ENUMERATED {n1, n2, n3,
                n4}
        }
    },
}
```

S2: The network device sends a downlink signal on a resource element corresponding to a resource configured by using the measurement configuration information, so that the terminal device determines, by measuring the downlink signal, channel information corresponding to each resource (to be specific, channel information of a beam corresponding to the resource).

S3: The terminal device measures the downlink signal based on the measurement configuration information, to be specific, a resource to be measured, time-frequency resources on which measurement is performed, an indicator to be measured, and the like.

S4: The terminal device sends a beam measurement report to the network device. The beam measurement report may include one or more indexes of one or more resources and channel information corresponding to the resources, for example, a CQI, a rank indication (RI), a precoding matrix indicator (PMI), and a layer indicator (LI).

To make objectives, technical solutions, and advantages of embodiments of this application clearer, the following further describes embodiments of this application in detail with reference to the accompanying drawings.

The channel measurement method provided in this application may be applied to various communication systems, for example, an internet of things (IoT), a narrowband internet of things (NB-IoT), long term evolution (LTE), a 5th generation (5G) communication system, an LTE and a 5G hybrid architecture, a 5G NR system, a new communication system emerging in future communication development, or the like. The 5G communication system described in this application may include at least one of a non-standalone (NSA) 5G communication system and a standalone (SA) 5G communication system. Alternatively, the communication system may be a public land mobile network (PLMN), a device-to-device (D2D) network, a machine to machine (M2M) network, or another network.

FIG. 1 shows a communication system 100 applicable to embodiments of this application. The communication system may include one or more network devices and one or more terminal devices. One network device may transmit data or control signaling to the one or more terminal devices. Alternatively, a plurality of network devices may simultaneously transmit data or control signaling to one terminal device.

Figure 2:
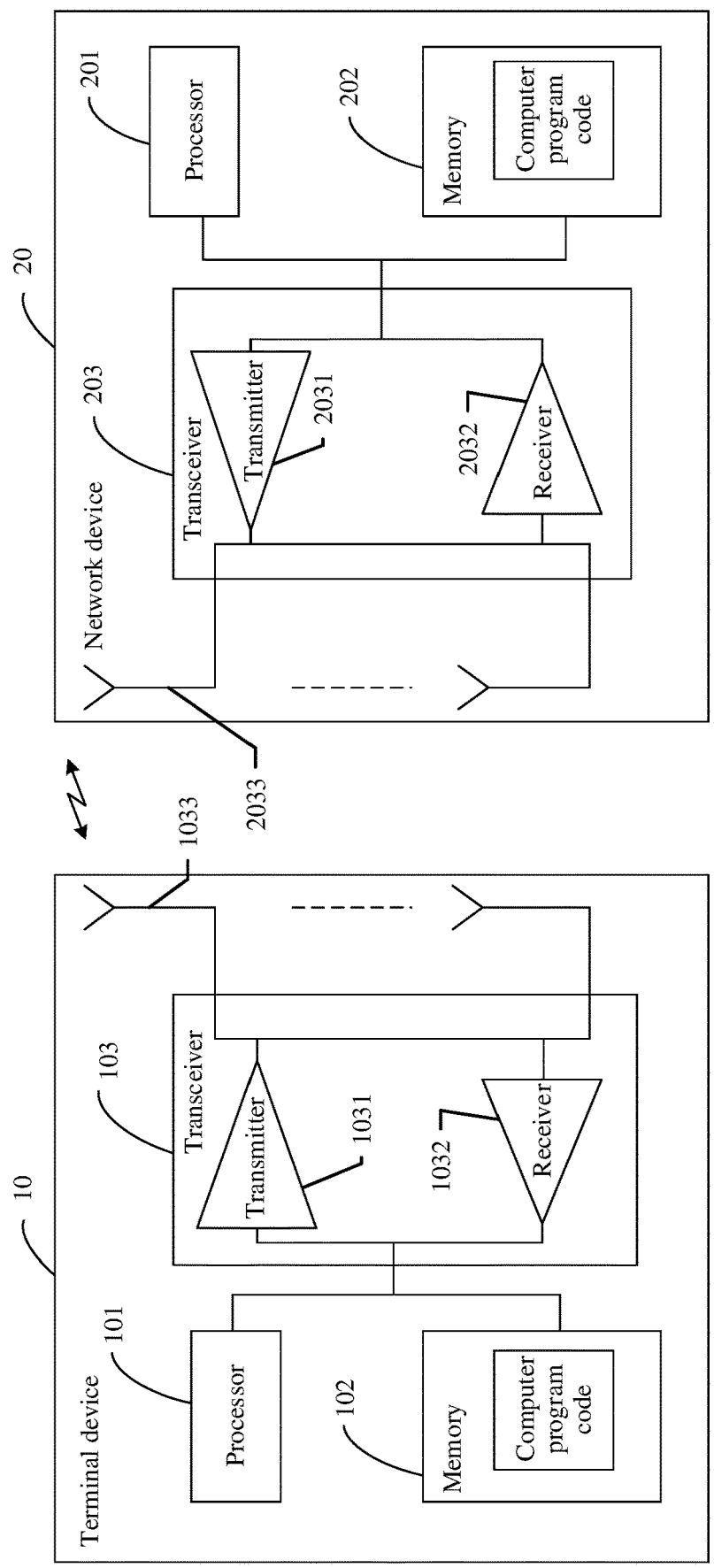
FIG. 2 is a schematic diagram of communication between a network device and a terminal device according to an embodiment of this application.

Communication between each network device and each terminal device in the communication system shown in FIG. 1 may alternatively be represented in another form. For example, as shown in FIG. 2, a terminal device 10 includes a processor 101, a memory 102, and a transceiver 103, and the transceiver 103 includes a transmitter 1031, a receiver 1032, and an antenna 1033. A network device 20 includes a processor 201, a memory 202, and a transceiver 203, and the transceiver 203 includes a transmitter 2031, a receiver 2032, and an antenna 2033. The receiver 1032 may be configured to receive transmission control information through the antenna 1033, and the transmitter 1031 may be configured to send transmission feedback information to the network device 20 through the antenna 1033. The transmitter 2031 may be configured to send the transmission control information to the terminal device 10 through the antenna 2033, and the receiver 2032 may be configured to receive, through the antenna 2033, the transmission feedback information sent by the terminal device 10.

The foregoing communication system applicable to embodiments of this application is merely an example for description, and a communication system applicable to embodiments of this application is not limited thereto. For example, the communication system may include another quantity of network devices and another quantity of terminal devices.

The terminal device in embodiments of this application is an entity that is on a user side and that is configured to receive or transmit a signal. The terminal device may be a device providing voice and data connectivity to a user, for example, a handheld device or a vehicle-mounted device having a wireless connection function. The terminal device may alternatively be another processing device connected to a wireless modem. The terminal device may communicate with one or more core networks by using a radio access network (RAN). The terminal device may alternatively be referred to as a wireless terminal, a subscriber unit, a subscriber station, a mobile station, a remote station, an access point, a remote terminal, an access terminal, a user terminal, a user agent, a user device, user equipment, or the like. The terminal device may be a mobile terminal, for example, a mobile phone (or referred to as a "cellular" phone), or a computer that has a mobile terminal. For example, the terminal device may be a portable, pocket-sized, handheld, computer built-in, or vehicle-mounted mobile apparatus, which exchanges a voice and/or data with the radio access network. For example, the terminal device may alternatively be a device such as a personal communications service (PCS) phone, a cordless telephone set, a session initiation protocol (SIP) phone, a wireless local loop (WLL) station, or a personal digital assistant (PDA). A common terminal device includes, for example, a mobile phone, a tablet, a notebook computer, a palmtop computer, a mobile internet device (MID), and a wearable device such as a smart watch, a smart band, or a pedometer. However, this is not limited in embodiments of this application. Alternatively, the terminal device in embodiments of this application may be a terminal device or the like that appears in a future evolved PLMN. This is not limited in embodiments of this application.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrowband (NB) technology.

In addition, in embodiments of this application, the terminal device may further include a sensor, for example, an intelligent printer, a train detector, or a gas station. Main functions of the terminal device include collecting data (by some terminal devices), receiving control information and downlink data from the network device, sending an electromagnetic wave, and transmitting uplink data to the network device.

The network device in embodiments of this application is an entity that is on a network side and that is configured to transmit or receive a signal. The network device in embodiments of this application may be a device in a wireless network, for example, a RAN node that enables the terminal to access the wireless network. For example, the network device may be an evolved NodeB (eNB or e-NodeB) in LTE, or may be a new radio controller (NR controller), a gNodeB (gNB) in a 5G system, a centralized unit (CU), a new radio base station, a radio remote module, a micro base station, a relay, a distributed unit (DU), a home NodeB, a transmission reception point (TRP), a transmission point (TP), or any other radio access device. However, this is not limited in embodiments of this application. The network device may cover one or more cells.

A network architecture and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

In a mobile communication system (for example, 5th generation (5G)), before data transmission, channel measurement needs to be performed to obtain channel information. A main method for channel measurement is as follows: A network device configures, for a terminal device, a resource used for channel measurement, and then sends the resource to the terminal device. The terminal device measures the resource, and finally feeds back, to the network device, a measurement result corresponding to the resource.

Figure 3:
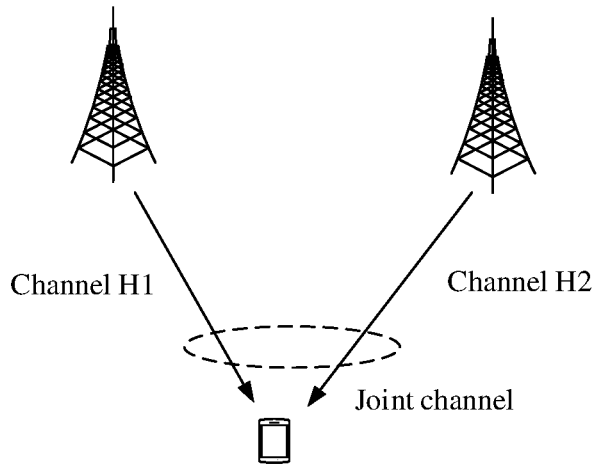
FIG. 3 is a schematic diagram of a joint channel according to an embodiment of this application.

A network side may transmit data for different terminal devices by using different transmission mechanisms. For example, for a terminal device located in a cell center, the network side may transmit data for the terminal device based on a single transmission and reception point (TRP); for a terminal device located at a cell edge, the network side may transmit data for the terminal device based on a plurality of TRPs. Data transmission based on a plurality of TRPs is referred to as coordinated multipoint transmission/reception (CoMP). During coordinated multipoint transmission/reception, channel measurement also needs to be performed. Coordinated multipoint transmission/reception of two TRPs is used as an example. A channel measured by the terminal device is a joint channel of the two TRPs, for example, as shown in FIG. 3. The terminal device needs to measure reference signals sent by the two TRPs, to determine channel quality of the joint channel including the two TRPs.

Currently, the network device may configure one channel resource for the terminal device, and the channel resource includes a plurality of port resources. The network device respectively sends the port resources by using a plurality of TRPs. After receiving the port resource sent by each TRP, the terminal device measures a signal transmitted on the TRP, so that multi-TRP joint measurement can be implemented. However, in a high-frequency transmission scenario, data transmission needs to be performed by using a specific beam. When a plurality of TRPs transmit data in a coordinated manner, different TRPs may use different transmission beams. Therefore, when the terminal device performs joint channel measurement on the plurality of TRPs, the plurality of TRPs may use different beams to send signals. However, only one piece of beam information can be configured in one channel resource. Therefore, a current joint channel measurement method cannot be applied to high-frequency channel measurement.

Based on this, embodiments of this application provide a channel measurement method and apparatus, to implement high-frequency channel measurement. The method and the apparatus are conceived based on a same invention concept. The method and the apparatus have similar principles for resolving problems. Therefore, for implementation of the apparatus and the method, refer to each other, and details of repeated parts are not described.

A resource set in embodiments of this application may be a resource setting and a resource configuration.

In embodiments of this application, that a channel resource and an interference resource have a same reception beam may be understood as that directions of reception beams corresponding to the channel resource and the interference resource are the same, may mean that the channel resource and the interference resource have a type D quasi-collocation relationship, or may mean that the channel resource and the interference resource use a same TCI-state.

In embodiments of this application, a measurement type may also be referred to as a measurement mode, and the measurement type may include at least two types: separate measurement and joint measurement. Separate measurement may be understood as separately measuring all measurement resources, to obtain channel information corresponding to each measurement resource. Separate measurement may also be referred to as independent measurement, channel separate measurement, separate channel measurement, independent channel measurement, channel independent measurement, or the like. Joint measurement may be understood as combining a plurality of measurement resources to perform measurement, to obtain joint channel information. Joint measurement may also be referred to as channel joint measurement, joint channel measurement, or the like. It should be understood that separate measurement and joint measurement are merely example names, and naming of the measurement type is not specifically limited. For ease of description, in the following, a measurement type in which all measurement resources are separately measured to obtain channel information corresponding to each measurement resource is uniformly referred to as separate measurement, and a measurement type in which a plurality of measurement resources are combined to perform measurement to obtain joint channel information is uniformly referred to as joint measurement.

In embodiments of this application, having/using a same TCI-state may be understood as having/using a same reception beam, or a same QCL assumption (for example, a type D QCL assumption), or may be understood as using a same TCI-state index, or a same reference signal resource included in type D QCL-info in the used TCI-state, or may be understood as having a QCL relationship, for example, having a type D QCL relationship. Having/using different TCI-states may be understood as having different reception beams, or different QCL assumptions (for example, type D QCL assumptions), or may be understood as using different TCI-state indexes, or different reference signal resources included in type D QCL-info in the used TCI-states, or may be understood as not having a QCL relationship, for example, not having a type D QCL relationship.

In embodiments of this application, the TRP and the measurement resource or the channel resource may be replaced with each other. For example, a phase difference/an inter-panel phase difference between precoding matrices/bases/cross-polarized ports corresponding to one TRP may be understood as a phase difference/an inter-panel phase difference between precoding matrices/bases/cross-polarized ports corresponding to one CSI-RS.

In embodiments of this application, the TRP and a port of the measurement resource or the channel resource may alternatively be replaced with each other. For example, a phase difference/an inter-panel phase difference between precoding matrices/bases/cross-polarized ports corresponding to one TRP may be understood as a phase difference/an inter-panel phase difference between precoding matrices/bases/cross-polarized ports corresponding to a group of ports corresponding to the TRP.

It should be understood that, in embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one (piece) of the following" or a similar expression thereof means any combination of these items, including any combination of singular items (pieces) or plural items (pieces). For example, at least one (piece) of a, b, or c may indicate a, b, c, a and b, a and c, b and c, or a, b, and c, where a, b, and c may be singular or plural.

In addition, it should be understood that in descriptions of this application, terms such as "first" and "second" are merely intended for purposes of description, and should not be understood as an indication or implication of relative importance, cannot be understood as an indication or implication of a sequence, and cannot represent a quantity.

The following describes in detail the method provided in embodiments of this application with reference to the accompanying drawings.

Embodiment 1

Figure 4:
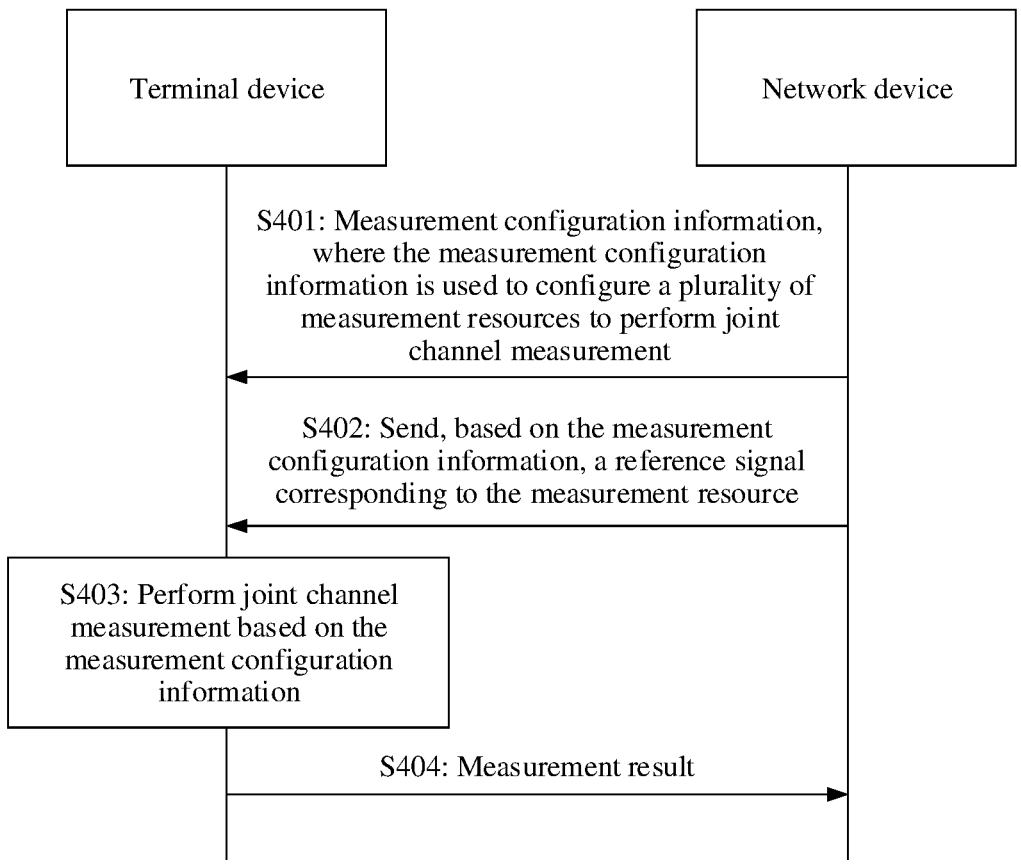
FIG. 4 is a schematic flowchart of a channel measurement method according to an embodiment of this application.

FIG. 4 is a flowchart of a channel measurement method according to this application. The method may be applied to a communication device, a chip, a chip set, or the like. The following uses the communication device as an example for description. The method includes the following steps.

S401: A network device sends measurement configuration information to a terminal. Correspondingly, the terminal device receives the measurement configuration information from the network device. The measurement configuration information is used to configure one or more groups of measurement resources, each group of measurement resources includes a plurality of measurement resources, and the group of measurement resources is used to perform joint channel measurement once. It should be noted that, in the plurality of groups of measurement resources configured by using the measurement configuration information, quantities of measurement resources included in all the groups of measurement resources may be equal or unequal. This is not specifically limited herein. In addition, if the measurement configuration information is used to configure a plurality of groups of measurement resources, a quantity of measurement resources included in one group of measurement resources may be 1.

For example, the measurement resource may be a channel resource used to measure a channel, and the channel resource may also be referred to as a channel measurement resource. Alternatively, the measurement resource may be an interference resource used to measure interference, and the interference resource may also be referred to as an interference measurement resource. A type of the channel resource may be any one or a combination of an NZP CSI-RS resource, an SSB resource, a CSI-IM resource, and a zero-power channel state information reference signal (ZP CSI-RS) resource. A type of the interference resource may be any one or a combination of an NZP CSI-RS resource, an SSB resource, a CSI-IM resource, and a ZP CSI-RS resource.

In an example for description, the measurement configuration information may include a measurement configuration, and the measurement configuration includes related configuration information of the measurement resource. For example, the measurement configuration is used to configure the foregoing one or more groups of measurement resources. For example, the measurement configuration may further include related parameters such as a sending periodicity, a time-frequency resource location, and a port quantity.

Optionally, the measurement configuration information may further include a reporting configuration.

In a possible implementation, for one group of measurement resources, the measurement configuration information further indicates whether measurement resources included in the group of measurement resources are used for joint channel measurement. According to the foregoing implementation, when the network device configures a plurality of measurement resources for the terminal device, the terminal device may determine whether the measurement resources are used for separate measurement or joint measurement.

In a specific implementation, the measurement configuration in the measurement configuration information may indicate whether the measurement resources included in the group of measurement resources are used for joint channel measurement.

In some embodiments, the measurement configuration information may indicate, in one or more of the following six manners, whether measurement resources included in one group of measurement resources are used for joint channel measurement.

Manner 1: The measurement configuration information may indicate a measurement type of the measurement resource by configuring a first parameter. There are at least two measurement types: joint measurement and separate measurement. If the measurement type is joint measurement, it indicates that measurement resources included in one group of measurement resources are used for joint channel measurement; if the measurement type is separate measurement, it indicates that measurement resources included in one group of measurement resources are not used for joint channel measurement. The first parameter may include one or more parameters. This is not specifically limited herein. An example in which the first parameter is a groupBasedBeamReporting parameter is used for description. The measurement configuration information may indicate the measurement type by using the groupBasedBeamReporting parameter. For example, when a value of the groupBasedBeamReporting parameter is set to enabled, it may indicate that joint measurement is used. When a value of the groupBasedBeamReporting parameter is set to disabled, it may indicate that separate measurement is used.

Further, when the measurement configuration information indicates to measure one or more of parameters such as a CQI, an RI, and a PMI, Manner 1 may indicate that the measurement resources included in the group of measurement resources are used for joint channel measurement. For example, if the measurement configuration information indicates to measure the one or more of parameters such as the CQI, the RI, and the PMI, the groupBasedBeamReporting parameter may indicate the measurement type.

Manner 2: The measurement configuration information may indicate, by configuring a second parameter, a quantity of measurement resources used for joint channel measurement. When the second parameter is configured to be a value greater than 1 (to be specific, the quantity of measurement resources used for joint channel measurement is configured to be greater than 1), it may indicate that a measurement type is joint measurement; otherwise, it may indicate that a measurement type is separate measurement. Alternatively, when the measurement configuration information configures a second parameter, it may indicate that a measurement type is joint measurement; when the measurement configuration information does not configure a second parameter, it may indicate that a measurement type is separate measurement.

Manner 3: The measurement configuration information may indicate, by using a quantity of resource sets in which measurement resources included in one group of measurement resources are located, whether the measurement resources included in the group of measurement resources are used for joint channel measurement. For example, if a plurality of measurement resources included in one group of measurement resources are configured in a plurality of resource sets, it may indicate that the plurality of measurement resources included in the group of measurement resources are used for joint channel measurement. If a plurality of measurement resources included in one group of measurement resources are configured in one resource set, it may indicate that the plurality of measurement resources included in the group of measurement resources are not used for joint channel measurement. For example, the group of measurement resources includes N measurement resources. If the N measurement resources are configured in N resource sets, it may indicate that the N measurement resources are used for joint channel measurement, where N is an integer greater than 1. For another example, the group of measurement resources includes M measurement resources. If the M measurement resources are configured in m resource sets, it may indicate that the M measurement resources are used for joint channel measurement, where M is an integer greater than 1, and m is an integer greater than 0 and less than M.

Manner 4: The measurement configuration information may indicate, by using a measurement resource configuration form, whether measurement resources included in one group of measurement resources are used for joint channel measurement. For example, if all the measurement resources are configured in a plurality of resource sets, it indicates that measurement resources in each resource set may be used as a group of measurement resources to perform joint channel measurement.

In an implementation, Manner 4 and Manner 1 may jointly indicate a measurement type. To be specific, when all the measurement resources are configured in a plurality of resource sets, and the first parameter (for example, groupBasedBeamReporting) indicates that the measurement type is joint measurement, the measurement resources in each resource set may be used as a group of measurement resources to perform joint channel measurement.

Manner 5: The measurement configuration information may indicate a measurement type by using a quantity of channel resources and the type of the interference resource. For example, when the type of the interference resource is an NZP CSI-RS and the quantity of channel resources is greater than 1, it may indicate that the measurement type is joint measurement.

Manner 6: The measurement configuration information may indicate a measurement type by using a codebook type. If the measurement type is joint measurement, it indicates that measurement resources included in one group of measurement resources are used for joint channel measurement; if the measurement type is separate measurement, it indicates that measurement resources included in one group of measurement resources are not used for joint channel measurement. For example, when the codebook type is configured as a specific type, it may indicate that the measurement type is joint measurement.

In an example for description, a plurality of measurement resources used for joint measurement may be referred to as one measurement resource group, that is, one group of measurement resources may be referred to as one measurement resource group.

In an example for description, the measurement resource group may be a physical group. For example, the measurement resource group may be a resource set. The network device may configure one or more resource sets for the terminal device. During joint channel measurement, resources in each resource set are combined to perform measurement. Optionally, the resource set may meet one or both of the following two conditions: A quantity of resource sets may be K, where K is a positive integer, for example, 1, 2, 4, or 8. A sum of port quantities of measurement resources in each resource set may not exceed H, where H is a positive integer, for example, 4, 8, 12, 16, 18, 24, 32, or 64. Alternatively, not all resource sets configured by the network device may be used for joint measurement. For example, resources in some resource sets are used for joint measurement, and resources in some resource sets are used for separate measurement. The network device may indicate which resource sets are used for joint measurement. For example, one or more parameters indicate whether a resource set is used for joint measurement or separate measurement.

A value of K or H may be indicated by using RRC signaling/a medium access control control element (MAC CE)/DCI signaling, or may be reported by using a UE capability reporting process, or may be stipulated in the protocol. If K or H is configured by using RRC signaling, K or H may be a mandatory parameter or an optional parameter. When K or H is not configured, K or H may be a default value. For example, the default value may be one of 2, 3, 4, 5, 6, 7, 8, 12, and 16.

In an example for description, a value/an upper limit of K or H may be but is not limited to any one of 1, 2, 3, 4, 5, 6, 7, 8, 12, and 16. In an example for description, a value range of K or H may be {1, 2, 3, 4, 5, 6, 7, 8, 12, 16} or a subset thereof.

It should be noted that value ranges of K and H may be the same, or may be different. The foregoing value and value range are merely examples for description, and the value ranges of K and H are not specifically limited.

In another example for description, the measurement resource group may alternatively be a logical group. In other words, the measurement resource group is not explicitly configured. For example, all measurement resources may be configured in one resource set, and every N measurement resources are used as one measurement resource group according to a configuration sequence of all the measurement resources or a sequence of indexes of the measurement resources. For example, six measurement resources {#2, #3, #4, #6, #1, #7} are configured, and every two measurement resources are used as one measurement resource group. Therefore, {#2, #3} may be used as one measurement resource group, {#4, #6} may be used as one measurement resource group, and {#1, #7} may be used as one measurement resource group. For another example, nine measurement resources {#1, #2, #3, #4, #5, #6, #7, #8, #9} are configured, and every three measurement resources are used as one measurement resource group. Therefore, {#1, #4, #7} may be used as one measurement resource group, {#2, #5, #8} may be used as one measurement resource group, and {#3, #6, #9} may be used as one measurement resource group. A manner of grouping the measurement resource group is not specifically limited in this embodiment of this application.

Measurement resources in one measurement resource group may be resources of a same cell, or may be measurement resources of different cells. This is not specifically limited herein.

Currently, because complexity of a type II codebook is high, it is stipulated in the protocol that if a reported codebook is a type 2 (type II) codebook, a quantity of measurement resources can only be configured to 1. However, in this embodiment of this application, when the type II codebook is used for reporting, a plurality of measurement resources may be configured. For example, when the measurement type is separate measurement, if a reported codebook type is the type II codebook, only a single measurement resource can be configured in the measurement configuration information; when the measurement type is joint measurement, if a reported codebook type is the type II codebook, a plurality of measurement resources may be configured in the measurement configuration information.

In an implementation, if the measurement type is joint measurement and the reported codebook type is the type II codebook, one measurement resource group may be configured in the measurement configuration information. For example, the measurement resource group may meet one or more of the following three conditions:

Condition 1: A quantity of measurement resources does not exceed L, where L is a positive integer, for example, 2, 4, or 8.

Condition 2: A port quantity of each measurement resource may not exceed S, where S is a positive integer, for example, 1, 2, 4, 8, or 16.

Condition 3: A sum of port quantities of all measurement resources does not exceed F, where F is a positive integer, for example, 2, 4, 8, 12, 16, 18, 24, 32, or 64.

A value of L, S, or F may be indicated by using RRC signaling/a MAC CE/DCI signaling, or may be reported by using a UE capability reporting process, or may be stipulated in the protocol. If L, S, or F is configured by using RRC signaling, L, S, or F may be a mandatory parameter or an optional parameter. When L, S, or F is not configured, L, S, or F may be a default value. For example, the default value may be one of 2, 3, 4, 5, 6, 7, 8, 12, and 16.

In an example for description, a value/an upper limit of L, S, or F may be but is not limited to any one of 1, 2, 3, 4, 5, 6, 7, 8, 12, and 16. In an example for description, a value range of L, S, or F may be {1, 2, 3, 4, 5, 6, 7, 8, 12, 16} or a subset thereof.

It should be noted that value ranges of L, S, and F may be the same, or may be different. The foregoing value and value range are merely examples for description, and the value ranges of L, S, and F are not specifically limited.

Currently, it is stipulated in the protocol that measurement resources in one resource set have equal frequency-domain densities, and equal port quantities. However, in this embodiment of this application, measurement resources in one resource set may have equal or unequal frequency-domain densities, and equal or unequal port quantities. When the measurement type is separate measurement, measurement resources in one resource set have equal frequency-domain densities, and equal port quantities; when the measurement type is joint measurement, measurement resources in one resource set may have equal or unequal frequency-domain densities, and equal or unequal port quantities.

In some embodiments, the measurement resource is the channel resource. The measurement configuration information is further used to configure the interference resource.

In an example for description, the interference resource may include one or more CSI-IM resources, and during joint channel measurement, one CSI-IM resource may be associated with one group of measurement resources. For example, the measurement resource group is a resource set. One CSI-IM resource may be associated with one resource set, and a quantity of CSI-IM resources may be equal to a quantity of resource sets. For another example, the measurement resource group is a logical group. If one measurement resource group includes N measurement resources, the measurement resources and CSI-IM resources may meet an N:1 quantity relationship. To be specific, every N measurement resources may be associated with one CSI-IM resource.

The CSI-IM resource has a same QCL relationship with the associated measurement resources. Therefore, the terminal device may determine a TCI-state or QCL information of the CSI-IM resource by using TCI-states or QCL information of the measurement resources in the measurement resource group associated with the CSI-IM resource, that is, receive the CSI-IM resource by using reception beams of the measurement resources, and perform measurement. For example, if a CSI-IM resource #1 is associated with measurement resources {#2, #3}, the terminal device may receive the CSI-IM resource #1 by using reception beams of the measurement resource #2 and the measurement resource #3.

In another example for description, the interference resource may further include one or more NZP CSI-RS resources. During joint channel measurement, one group of measurement resources is associated with at least one NZP CSI-RS resource. The at least one NZP CSI-RS resource associated with a same group of measurement resources may be referred to as an interference resource group. One interference resource group may be one resource set.

The at least one NZP CSI-RS resource associated with a same group of measurement resources has a same QCL relationship with the associated measurement resources. Therefore, the terminal device may determine a TCI-state or QCL information of each associated NZP CSI-RS resource by using TCI-states or QCL information of the measurement resources in the measurement resource group, that is, receive the associated NZP CSI-RS resources by using reception beams of the measurement resources, and perform measurement. The terminal device may use each associated NZP CSI-RS interference resource as an interference layer, and calculate interference of a corresponding measurement resource by adding energy corresponding to all interference layers.

Currently, it is stipulated in the protocol that when the type of the interference resource is an NZP CSI-RS, the quantity of channel resources is 1. However, in this embodiment of this application, when the type of the interference resource is the NZP CSI-RS, the quantity of channel resources may be greater than 1. For example, when the measurement type is separate measurement, if an interference resource whose type is the NZP CSI-RS is configured, a single channel resource is configured in the measurement configuration information. When the measurement type is joint measurement, if an interference resource whose type is the NZP CSI-RS is configured, a plurality of channel resources may be configured in the measurement configuration information.

In an implementation, when the measurement type is joint measurement, if an interference resource whose type is the NZP CSI-RS is configured, a group of channel resources may be configured in the measurement configuration information. Optionally, the group of channel resources may meet at least one of the following conditions: A quantity of channel resources in the group of channel resources does not exceed Q, where Q is a positive integer, for example, 2, 4, or 8; a port quantity of each channel resource does not exceed Y, where Y is a positive integer, for example, 1, 2, 4, 8, or 16; and a sum of port quantities of all channel resources does not exceed Z, where Z is a positive integer, for example, 2, 4, 8, 12, 16, 18, 24, 32, or 64.

A value of Q, Y, or Z may be indicated by using RRC signaling/a MAC CE/DCI signaling, or may be reported by using a UE capability reporting process, or may be stipulated in the protocol. If Q, Y, or Z is configured by using RRC signaling, Q, Y, or Z may be a mandatory parameter or an optional parameter. When Q, Y, or Z is not configured, Q, Y, or Z may be a default value. For example, the default value may be one of 2, 3, 4, 5, 6, 7, 8, 12, and 16.

In an example for description, a value/an upper limit of Q, Y, or Z may be but is not limited to any one of 1, 2, 3, 4, 5, 6, 7, 8, 12, and 16. In an example for description, a value range of Q, Y or Z may be {1, 2, 3, 4, 5, 6, 7, 8, 12, 16} or a subset thereof.

It should be noted that value ranges of Q, Y and Z may be the same, or may be different. The foregoing value and value range are merely examples for description, and the value ranges of Q, Y, and Z are not specifically limited.

S402: The network device sends, based on the measurement configuration information, a reference signal corresponding to the measurement resource. One measurement resource may correspond to one reference signal.

S403: The terminal device performs joint channel measurement based on the measurement configuration information.

In an implementation, for each group of measurement resources, the terminal device may determine a channel corresponding to each measurement resource in the group of measurement resources, and then jointly determine a precoding matrix based on channels corresponding to all measurement resources in the group of measurement resources.

In some embodiments, the terminal device may have a plurality of joint measurement manners. For example, the plurality of joint measurement manners may include at least the following two manners:

Joint measurement manner 1: Determine one precoding matrix based on a plurality of measurement resources included in each group of measurement resources. The following uses an example in which each group of measurement resources includes X measurement resources for description. The joint measurement manner 1 may be jointly measuring the X measurement resources to determine one PMI, where a port quantity of the PMI may be equal to a sum of port quantities of the X measurement resources. The PMI is obtained through joint calculation. For example, it is assumed that when X=2, channels corresponding to the two measurement resources are H1 and H2. The terminal device may determine one W, to enable energy that meets [H1, H2]W to be maximum. The terminal device may report the PMI to the network device.

In an example for description, one RI may be further determined based on the PMI, and the RI indicates a quantity of streams (rank) used by the PMI. The terminal device may report the RI to the network device.

In an example for description, one CQI may be further determined based on the group of measurement resources. The CQI is a CQI obtained through joint measurement based on all measurement resources, and indicates channel quality of a joint channel including all the measurement resources. The terminal device may report the CQI to the network device.

In addition, the terminal device may further report an LI to the network device, to indicate one of a plurality of streams indicated by the RI, for example, the best stream. The terminal device may further report, to the network device, i1 information corresponding to all the measurement resources, where the i1 information may include full-band information in the PMI information.

Joint measurement manner 2: Determine a plurality of precoding matrices based on a plurality of measurement resources included in each group of measurement resources, where the plurality of measurement resources are in one-to-one correspondence with the plurality of precoding matrices. The following uses an example in which each group of measurement resources includes X measurement resources for description. The joint measurement manner 2 may be jointly measuring X measurement resources to determine X PMIs, where each PMI corresponds to one measurement resource. A port quantity of the PMI is equal to a port quantity of a corresponding measurement resource. The X PMIs are obtained through joint calculation. For example, it is assumed that when X=2, channels corresponding to the two measurement resources are H1 and H2. The terminal device may determine two Ws, namely, W1 and W2, to enable energy that meets [H1W1, H2W2] to be maximum. The terminal device may report the X PMIs to the network device.

For example, one RI may be further determined based on the X PMIs, and the RI corresponds to the X PMIs. The terminal device may report the RI to the network device. Alternatively, X RIs may be further determined based on the X PMIs, and one RI corresponds to one PMI. The terminal device may report the X RIs to the network device.

For example, one CQI may be further determined based on each group of measurement resources, where the CQI corresponds to the X PMIs. In other words, the CQI is a joint CQI calculated based on the X measurement resources, and indicates channel quality of a joint channel including all the measurement resources. The terminal device may report the CQI to the network device. Alternatively, X CQIs may be further determined based on each group of measurement resources, and one CQI corresponds to one PMI.

In some embodiments, during joint measurement, when measuring one channel resource, the terminal device may use another channel resource as an interference resource.

In addition, the terminal device may alternatively report a plurality of Us to the network device. Each LI corresponds to one RI or PMI, and indicates one of a plurality of streams corresponding to the reported RI or PMI, for example, the strongest stream. Alternatively, the terminal device may report a plurality of pieces of i1 information to the network device. Each piece of i1 information corresponds to one measurement resource, and the i1 information includes the full-band information in the PMI information.

In addition to the foregoing two joint measurement manners, another joint measurement manner may be further used. This is not limited in this embodiment of this application.

When the protocol supports only one joint measurement manner, when the measurement configuration information indicates that measurement resources included in one group of measurement resources are used for joint channel measurement, the joint measurement manner may be used to perform joint channel measurement.

When the protocol supports a plurality of joint measurement manners, for example, supports the foregoing two joint measurement manners, the measurement configuration information may further indicate which joint measurement manner is to be specifically used. For example, the measurement configuration information may indicate, by using one or more parameters, which joint measurement manner is to be specifically used. For another example, a parameter indicating a measurement type/codebook type/measurement mode may be set. The parameter may have a plurality of optional values, and each value indicates a joint measurement manner. If the parameter is not set, it may indicate that joint measurement is not used. The parameter may also have an optional value to indicate separate measurement. When the parameter is set to the optional value, it may indicate that joint measurement is not used. Alternatively, the measurement configuration information may further indicate, by using a reported reporting quantity, which joint measurement manner is to be used. For example, the foregoing two joint measurement manners correspond to different reporting quantity options. By using the configured reporting quantity, the terminal device may determine whether to use joint measurement, or determine which joint measurement manner is to be used.

For example, a specific joint measurement manner to be used by the terminal device may alternatively be determined by the terminal device.

For example, the plurality of joint measurement manners may be configured by the network device for the terminal device, or may be preconfigured by the terminal device. Optionally, the terminal device may report, by using a capability reporting parameter, whether to support joint measurement, or report a specific supported joint measurement manner.

A PMI is an identifier of a precoding matrix. An essence of reporting a PMI is to notify the network device of a precoding matrix, so that the network device transmits data by using the precoding matrix. To reduce reporting overheads, some precoding matrix sets are defined in the current protocol, and the terminal device only needs to report precoding matrices in the sets. The predefined precoding matrices are also referred to as codebooks. Currently, there are four different codebook sets or codebook types in the protocol: a type I single-panel codebook, a type I multi-panel codebook, a type II codebook, and a type II port selection codebook.

Type I single-panel codebook:

The codebook is essentially a matrix. A quantity of rows is equal to a quantity of antenna ports (a quantity of CSI-RS ports), a quantity of columns is equal to a rank or a quantity of layers (a quantity of streams for data transmission), and each column corresponds to a precoding matrix of one layer. For example, Rank=1 and the measurement resource is a CSI-IS. A corresponding codebook format is a matrix whose quantity of columns is 1.

$$W^{(1)}_{l,m,n} = \frac{1}{\sqrt{P_{CSI-RS}}} \begin{bmatrix} v_{l,m} \\ \varphi_n v_{l,m} \end{bmatrix}.$$

$P_{CSI-RS}$ is a quantity of CSI-RS ports, and is used to normalize precoding matrices. $v_{l,m}$ is a column vector, and indicates a precoding matrix corresponding to half of the CSI-RS ports. A precoding matrix corresponding to the other half of the CSI-RS ports is $\varphi_n v_{l,m}$, which is equal to $v_{l,m}$ multiplied by $\varphi_n$. $\varphi_n$ is used to perform phase compensation on the two precoding matrices. This is because cross polarization is usually used for base station antennas. To be specific, half of the antennas correspond to one polarization direction, and the other half of the antennas correspond to another polarization direction. There is a fixed phase difference between precoding matrices corresponding to two groups of antennas. Bases $v_{l,m}$ of the precoding matrices corresponding to the two groups of antennas are the same, except that there is a phase difference $\varphi_n$ between the precoding matrices.

When Rank=2, the precoding matrix is a matrix with two columns, and a format is as follows:

$$W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}.$$

Compared with the precoding matrix that exists when Rank=1, the precoding matrix that exists when Rank=2 has one more column. A composition manner of the column is similar to that of the first column, and a difference lies in that another base $v_{l',m'}$ is used.

A codebook with a higher RANK may be deduced by analogy. A principle is to add a new column. In each column, CSI-RS ports are divided into two groups, a same base is used for each group, and there is a phase difference between the two groups.

For the type I single-panel codebook, base-related parameters l and m may be reported, and used by the network device to determine the base $v_{l,m}$. l and m may also be represented as $i_{1,1}$ and $i_{1,2}$. After knowing values of l and m, the network device may calculate $v_{l,m}$ by using the following formula, where $N_1$ and $N_2$ indicate quantities of horizontal and vertical CSI-RS ports, and $O_1$ and $O_2$ indicate horizontal and vertical oversampling multiples:

$$u_m = \begin{cases} \left[1, e^{j\frac{2\pi m}{O_2 N_2}}, \ldots, e^{j\frac{2\pi m(N_2-1)}{O_2 N_2}}\right], & N_2 > 1 \\ 1, & N_2 = 1 \end{cases}$$

$$v_{l,m} = \left[u_m, e^{j\frac{2\pi m}{O_1 N_1}} u_m, \ldots, e^{j\frac{2\pi m(N_1-1)}{O_1 N_1}} u_m\right]^T.$$

$i_{1,3}$ may be further reported, $k_1$ and $k_2$ may be determined by looking up a table by using $i_{1,3}$, and values of l' and m' may be determined by using $l'=i_{1,1}+k_1$ and $m'=i_{1,2}+k_2$, to determine the base $v_{l',m'}$. A formula used for calculating $v_{l',m'}$ based on l' and m' is the same as that described above.

$\varphi_n \varphi_n = e^{j\pi n/2}$ parameter n may be further reported, and is used to determine the phase difference of the precoding matrices between the cross-polarized antennas, where n is also represented as $i_2$, and $\varphi_n \varphi_n = e^{j\pi n/2}$ In other words, the terminal device needs to report values of the parameters $i_{1,1}$, $i_{1,2}$, $i_{1,3}$, and $i_2$, and the network device can obtain a corresponding precoding matrix through calculation by using these values according to the foregoing method.

Type I multi-panel codebook:

The type I multi-panel codebook is finer than the type I single-panel codebook, and different antenna panels need to be distinguished from each other. For example, Rank=1 and a quantity of panels is equal to 2. A corresponding codebook format is a matrix whose quantity of columns is 1.

$$W_{l,m,p,n}^{1,2,1} = \frac{1}{\sqrt{P_{CSI-RS}}} \begin{bmatrix} v_{l,m} \\ \varphi_n v_{l,m} \\ \varphi_{p1} v_{l,m} \\ \varphi_{p1} \varphi_n v_{l,m} \end{bmatrix}.$$

The foregoing codebook is a two-panel codebook. Therefore, a dimension of the codebook is twice that of the single-panel codebook. The first two items correspond to a precoding matrix of the first panel, and a principle is the same as that of the single-panel codebook. The last two items correspond to a precoding matrix of the second panel, and the essence of the last two items is to multiply the first two items by a phase difference $\varphi_{p1}$, to compensate for a phase difference caused by a spacing between the two antenna panels. In other words, the multi-panel codebook is essentially extension of the single-panel codebook. If there are P panels, the single-panel codebook is extended into P groups. Each group corresponds to one panel, and relative to a first group, the group corresponding to the panel needs to be multiplied by one phase offset, to compensate for a signal phase difference caused by a spacing between the panel and the first panel.

$\varphi_{p1} \varphi_{p1} \varphi_{p2} \varphi_{p3} \varphi_p = e^{j\pi p/2}$ In addition to the foregoing parameters $i_{1,1}$, $i_{1,2}$, $i_{1,3}$, and $i_2$, the terminal device may further report a parameter $i_{1,4}$ corresponding to the phase difference between different panels. If there are only two panels in total, $i_{1,4}$ has only one value, which is used to calculate the phase difference between the two panels. If there are four panels, phase differences, and between precoding matrices of the last three panels and the first panel need to be determined. In this case, $i_{1,4}$ includes three values $i_{1,4}=[i_{1,4,1}, i_{1,4,2}, i_{1,4,3}]$, and $\varphi_{p1} \varphi_{p1} \varphi_{p1} \varphi_{p2} \varphi_{p3} \varphi_p = e^{j\pi p/2}$.

In other words, the terminal device may report values of the parameters $i_{1,1}$, $i_{1,2}$, $i_{1,3}$, $i_{1,4}$, and $i_2$, and the network device can obtain a corresponding precoding matrix through calculation by using these values according to the foregoing method.

The type I codebook is simple, and has low feedback overheads, poor precision, and a large quantization error. The type II codebook is complex, and has high feedback overheads, high precision, and a small quantization error. There are two types of type I codebooks: single-panel and multi-panel. A codebook of the single-panel type is used in a case in which a single TRP performs transmission by using a single antenna panel. A codebook of the multi-panel type is used in a case in which a single TRP performs transmission by using a plurality of panels. Both the types are applicable to single-TRP transmission and are not applicable to multi-TRP transmission. In other words, currently, the type I codebook is not specially adapted to multi-TRP transmission. Therefore, when the terminal device jointly measures a channel including a plurality of TRPs, a codebook (regardless of a single-panel codebook or a multi-panel codebook) reported by the terminal device to the network device are inaccurate. As a result, data transmission performance is impaired.

Based on this, an embodiment of this application provides a codebook type, and the codebook type is applicable to multi-TRP joint measurement. For ease of description, the codebook type applicable to multi-TRP joint measurement is referred to as a multi-TRP codebook below. It should be understood that herein is merely an example name, and a name of the codebook is not specifically limited. The multi-TRP codebook may include a parameter set corresponding may to each measurement resource in each group of measurement resources, and a phase difference between any two measurement resources.

In the type I multi-panel codebook, a plurality of codebooks use a same base. Therefore, only one group of $i_{1,1}$ and $i_{1,2}$ parameter values need to be reported. A same base is used. This is because different antenna panels of a same TPR are placed in parallel, in other words, included angles between a plurality of panels and a channel feature direction are the same. Therefore, a same base may be used. However, in multi-TRP joint channel measurement, because panels of a plurality of TRPs are not necessarily parallel, a same base cannot be directly used. That is, each TRP should independently use a base of the TRP. In other words, a base may be independently determined for each TRP in the multi-TRP codebook, a precoding matrix corresponding to each TRP is generated based on the base, and then the precoding matrices corresponding to all TRPs are combined to form the multi-TRP codebook. A codebook corresponding to each TRP is equal to a port quantity of the TRP.

In an implementation, it is assumed that a joint codebook corresponding to T TRPs need to be determined, and each TRP has P panels. Each TRP corresponds to one base. For example, a base corresponding to a TRP i is $v_{l_i,m_i}$. The terminal device needs to report values of $l_i$ and $m_i$ that correspond to each TRP. For example, $i_{1,1}$ and $i_{1,2}$ are reported, $i_{1,1}$ and $i_{1,2}$ each include a plurality of values, where $i_{1,1}=[i_{1,1,1}, i_{1,1,2}, \ldots, i_{1,1,T}]$, and $i_{1,1}=[i_{1,2,1}, i_{1,2,2}, \ldots, i_{1,2,T}]$. Similarly, one $i_{1,3}$ needs to be reported for each TRP, that is, a plurality of values of $i_{1,3}$ need to be reported, where $i_{1,3}=[i_{1,3,1}, i_{1,3,2}, \ldots, i_{1,3,T}]$.

For each TRP, there is a phase difference between cross-polarized antennas of the TRP. For example, a cross-polarized phase difference corresponding to the TRP i is $\varphi_{n_i}$. The terminal device needs to report a value of $n_i$ corresponding to each TRP. For example, $i_2$ is reported, and $i_2$ includes a plurality of values, where $i_2=[i_{2,1}, i_{2,2}, \ldots, i_{2,T}]$. Alternatively, different TRPs may correspond to the same $\varphi_{n_i}$. In this case, the terminal device needs to report only one value of $n_i$, that is, $i_2$ has only one value.

When one TRP has a plurality of panels, phase differences between cross-polarized antennas on different panels may be different. In this case, for each TRP, the terminal device needs to report a plurality of cross-polarized phase differences $\varphi_{n_i}$. For each TRP, there is a phase difference between a plurality of panels of the TRP. For example, an inter-panel phase difference corresponding to the TRP i is $\varphi_{p_i}$. When a quantity P of panels is greater than 2, there are a plurality of $\varphi_{p_i}$s. For example, $\varphi_{p_i}=[\varphi_{p_{i,1}}, \varphi_{p_{i,2}}, \ldots, \varphi_{p_{i,P-1}}]$. The terminal device needs to report a value of $\varphi_{p_i}$ corresponding to each TRP. For example, $i_{1,4}$ is reported, $i_{1,4}$ includes a plurality of groups of values, and each group of values corresponds to one TRP. Each group of values includes a plurality of values, and corresponds to a plurality of panel phase differences. For example, $i_{1,4}=[i_{1,4,1}, i_{1,4,2}, \ldots, i_{1,4,T}]$. $i_{1,4,i}=[i_{1,4,i,1}, i_{1,4,i,2}, \ldots, i_{1,4,i,P-1}]$. Alternatively, different TRPs may correspond to the same $\varphi_{p_i}$. In this case, the terminal device needs to report only one group of $i_{1,4}$, where $i_{1,4}=[i_{1,4,1}, i_{1,4,2}, \ldots, i_{1,4,P-1}]$.

There is also a phase difference between different TRPs. For example, there is a phase difference between the first TRP and each of the second TRP to the $T^{th}$ TRP. For example, a phase difference between the TRP i (where i>1) and the first TRP is $\varphi_{t_i}$. The terminal device needs to report $\varphi_{t_i}$ corresponding to each TRP. For example, $i_{1,5}$ is reported, and $i_{1,5}$ includes a plurality of values: $i_{1,5}=[i_{1,5,1}, i_{1,5,2}, \ldots, i_{1,5,T-1}]$. When there are only two TRPs, only one $\varphi_{t_i}$ value needs to be reported.

Optionally, it may be stipulated that a plurality of TRPs correspond to an equal panel quantity. Alternatively, an upper limit of a panel quantity corresponding to each TRP is constrained. For example, it is stipulated that the upper limit is 1, 2, 3, 4, or the like. Alternatively, an upper limit of a sum of panel quantities corresponding to all the TRPs may be stipulated. For example, it is stipulated that the upper limit is 2, 4, 6, 8, or the like. The upper limit of the panel quantity corresponding to each TRP and the upper limit of the sum of the panel quantities corresponding to all the TRPs may be stipulated in the protocol, or may be configured by the network device, or may be reported by the terminal device in a terminal capability reporting process.

Optionally, it may be further stipulated that a plurality of TRPs correspond to an equal port quantity. Alternatively, an upper limit of a port quantity corresponding to each TRP is constrained. For example, it is stipulated that the upper limit is 1, 2, 4, 8, 12, 16, 18, 20, 24, 32, 64, or the like. Alternatively, an upper limit of a sum of port quantities corresponding to all the TRPs may be stipulated. For example, it is stipulated that the upper limit is 2, 4, 8, 12, 16, 18, 20, 24, 32, 64, or the like. The upper limit of the port quantity corresponding to each TRP and the upper limit of the sum of the port quantities corresponding to all the TRPs may be stipulated in the protocol, or may be configured by the network device, or may be reported by the terminal device in a terminal capability reporting process.

For example, a quantity of TRPs for performing joint measurement may be configured in the measurement configuration information. A panel quantity corresponding to each TRP may also be configured in the measurement configuration information. A port quantity corresponding to each TRP or a port quantity corresponding to each panel of each TRP may be configured in the measurement configuration information. Alternatively, the foregoing information may be reported by the terminal device to the network device by using the terminal capability reporting process.

The terminal device may further report, by using the capability reporting process, whether to support measurement of the foregoing multi-TRP codebook. Alternatively, whether to support measurement of the multi-TRP codebook of a plurality of TRPs with different port quantities or measurement of the multi-TRP codebook of a plurality of CSI-RSs with different port quantities is reported by using the capability reporting process.

In some embodiments, the multi-TRP codebook may be further applicable to a case in which a port quantity of a single TRP is greater than 2 or greater than or equal to 4. When the port quantity of the TRP is equal to 2, a number of a precoding matrix corresponding to each TRP may be determined based on Table 1, and the number of the precoding matrix corresponding to the TRP is reported to the network device. In addition, a phase difference between TRPs (for example, a phase difference between another TRP and the first TRP) may be further reported to the network device.

TABLE 1

| Codebook index | Layer quantity | |
|---|---|---|
|  | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |
| 1 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\-1\end{bmatrix}$ | — |
| 3 | $\frac{1}{\sqrt{2}}\begin{bmatrix}1\\-j\end{bmatrix}$ | — |

The following describes the multi-TRP codebook with reference to several examples.

$$w = \frac{1}{\sqrt{P_{CSI-RS}}}\begin{bmatrix}v_{l_1,m_1}\\\varphi_{n_1}v_{l_1,m_1}\\\varphi_{t_1}v_{l_2,m_2}\\\varphi_{t_1}\varphi_{n_2}v_{l_2,m_2}\end{bmatrix}$$

Example 1: Two TRPs perform joint transmission, each TRP uses a single panel, and rank=1. A PMI of a joint channel may be as follows:

$$w = \frac{1}{\sqrt{P_{CSI-RS}}} \begin{bmatrix} v_{l_1,m_1} \\ \varphi_{n_1} v_{l_1,m_1} \\ \varphi_{t_1} v_{l_2,m_2} \\ \varphi_{t_1} \varphi_{n_2} v_{l_2,m_2} \end{bmatrix}.$$

$P_{CSI-RS}$ is a sum of port quantities of all TRPs. $v_{l_1,m_1}$ and $\varphi_{n_1} v_{l_1,m_1}$ are precoding matrices corresponding to antenna ports in two groups of polarization directions of the first TRP. $\varphi_{t_1} v_{l_2,m_2}$ and $\varphi_{t_1} \varphi_{n_2} v_{l_2,m_2}$ are precoding matrices corresponding to antenna ports in two groups of polarization directions of the second TRP. The terminal device may report $[l_1,l_2]$, $[m_1,m_2]$, $[n_1,n_2]$, and $t_1$ to the network device. In other words, the codebook reported by the terminal device may be $[l_1,l_2]$, $[m_1,m_2]$, $[n_1,n_2]$, and $t_1$.

$$w = \frac{1}{\sqrt{P_{CSI-RS}}} \begin{bmatrix} v_{l_1,m_1} \\ \varphi_{n_1} v_{l_1,m_1} \\ \varphi_{p_1} v_{l_1,m_1} \\ \varphi_{p_1} \varphi_{n_1} v_{l_1,m_1} \\ \varphi_{t_1} \begin{pmatrix} v_{l_2,m_2} \\ \varphi_{n_2} v_{l_2,m_2} \\ \varphi_{p_2} v_{l_2,m_2} \\ \varphi_{p_2} \varphi_{n_2} v_{l_2,m_2} \end{pmatrix} \end{bmatrix} = \frac{1}{\sqrt{P_{CSI-RS}}} \begin{bmatrix} v_{l_1,m_1} \\ \varphi_{n_1} v_{l_1,m_1} \\ \varphi_{p_1} v_{l_1,m_1} \\ \varphi_{p_1} \varphi_{n_1} v_{l_1,m_1} \\ \varphi_{t_1} v_{l_2,m_2} \\ \varphi_{t_1} \varphi_{n_2} v_{l_2,m_2} \\ \varphi_{t_1} \varphi_{p_2} v_{l_2,m_2} \\ \varphi_{t_1} \varphi_{p_2} \varphi_{n_2} v_{l_2,m_2} \end{bmatrix}$$

Example 2: Two TRPs perform joint transmission, each TRP uses two panels, and rank=1. A PMI of a joint channel may be as follows:

$$w = \frac{1}{\sqrt{P_{CSI-RS}}} \begin{bmatrix} v_{l_1,m_1} \\ \varphi_{n_1} v_{l_1,m_1} \\ \varphi_{p_1} v_{l_1,m_1} \\ \varphi_{p_1} \varphi_{n_1} v_{l_1,m_1} \\ \varphi_{t_1} \begin{pmatrix} v_{l_2,m_2} \\ \varphi_{n_2} v_{l_2,m_2} \\ \varphi_{p_2} v_{l_2,m_2} \\ \varphi_{p_2} \varphi_{n_2} v_{l_2,m_2} \end{pmatrix} \end{bmatrix} = \frac{1}{\sqrt{P_{CSI-RS}}} \begin{bmatrix} v_{l_1,m_1} \\ \varphi_{n_1} v_{l_1,m_1} \\ \varphi_{p_1} v_{l_1,m_1} \\ \varphi_{p_1} \varphi_{n_1} v_{l_1,m_1} \\ \varphi_{t_1} v_{l_2,m_2} \\ \varphi_{t_1} \varphi_{n_2} v_{l_2,m_2} \\ \varphi_{t_1} \varphi_{p_2} v_{l_2,m_2} \\ \varphi_{t_1} \varphi_{p_2} \varphi_{n_2} v_{l_2,m_2} \end{bmatrix}.$$

$P_{CSI-RS}$ is a sum of port quantities of all TRPs. $v_{l_1,m_1}$ and $\varphi_{n_1} v_{l_1,m_1}$ are precoding matrices corresponding to antenna ports in two groups of polarization directions of the first panel of the first TRP. $\varphi_{p_1} v_{l_1,m_1}$ and $\varphi_{p_1} \varphi_{n_1} v_{l_1,m_1}$ are precoding matrices corresponding to antenna ports in two groups of polarization directions of the second panel of the first TRP. $\varphi_{t_1} v_{l_2,m_2}$ and $\varphi_{t_1} \varphi_{n_2} v_{l_2,m_2}$ are precoding matrices corresponding to antenna ports in two groups of polarization directions of the first panel of the second TRP. $\varphi_{t_1} \varphi_{p_2} v_{l_2,m_2}$ and $\varphi_{t_1} \varphi_{p_2} \varphi_{n_2} v_{l_2,m_2}$ are precoding matrices corresponding to antenna ports in two polarization directions of the second panel of the second TRP. The terminal device may report $[l_1,l_2]$, $[m_1,m_2]$, $[n_1,n_2]$, $[p_1,p_2]$, and $t_1$ to the network device. In other words, the codebook reported by the terminal device may be $[l_1,l_2]$, $[m_1,m_2]$, $[n_1,n_2]$, $[p_1,p_2]$, and $t_1$.

It may be understood that a case in which the quantity of TRPs is greater than 2 may be obtained by analogy based on the foregoing Example 1 and Example 2; a case in which the rank is greater than 1 may be obtained by analogy based on the foregoing Example 1 and Example 2; a case in which the panel quantity included in the TRP is greater than 2 may be obtained by analogy based on the foregoing Example 1 and Example 2; a case in which the panel quantities included in all the TRPs are unequal may be obtained by analogy based on the foregoing Example 1 and Example 2.

In some embodiments, the terminal device may configure, by using a bitmap, whether each base can be used. For example, if a base cannot be used, the terminal device cannot generate a codebook based on the base.

For example, the measurement resource is the channel resource. During measurement of the multi-TRP joint codebook, the terminal device may use a plurality of bitmaps to respectively configure bases that can be used by each TRP. For example, when joint channel measurement may be performed by using T channel resources, each channel resource corresponds to one bitmap. A length of each bitmap may be equal to a base quantity $N1*O1*N2*O2$ corresponding to the channel resource, where N1 and N2 are quantities of horizontal and vertical ports of the channel resource, and O1 and O2 are horizontal and vertical oversampling multiples of the channel resource.

Alternatively, the terminal device may use one bitmap to configure bases that can be used by all TRPs. For example, the measurement resource is the channel resource. When joint channel measurement is performed by using T channel resources, one bitmap is used. A length of the bitmap may be equal to a product of base quantities corresponding to all channel resources. The base quantity of the channel resource may be equal to $N1*O1*N2*O2$, where N1 and N2 are quantities of horizontal and vertical ports of the channel resource, and O1 and O2 are horizontal and vertical oversampling multiples of the channel resource.

In an example for description, the multi-TRP codebook may be used as a new codebook type. Alternatively, the multi-TRP codebook may be used as a subtype of the type I codebook type, for example, a type I multi-TRP or type I multi-RS type. Alternatively, the multi-TRP codebook may be used as a subtype of the type I multi-panel codebook type.

S404: The terminal device reports a measurement result to the network device.

In an implementation, the terminal device may report the measurement result through an uplink channel, for example, a PUCCH/PUSCH.

A measurement configuration is classified into a resource configuration and a reporting configuration. Each reporting configuration is associated with one or more resource configurations. The terminal device may perform measurement based on the resource configurations, and perform reporting based on the reporting configuration. For example, reporting is performed based on a PUCCH resource in the reporting configuration. When PUCCHs corresponding to a plurality of reporting configurations are the same, the terminal device may report, through the PUCCH, measurement results corresponding to the plurality of reporting configurations. For example, as shown in Table 2, assuming that the PUCCH/PUSCH needs to carry measurement results corresponding to $N_{rep}$ reporting configurations, priority sorting may be performed on to-be-reported content based on priorities in Table 2. The content with a highest priority (priority o) may be wideband measurement results corresponding to all reporting configurations, for example, wideband PMIs. For subband measurement results, priorities may be sequentially decreased in ascending order of numbers of reporting configurations. A same reporting configuration may be further classified into two levels of priorities. For example, a priority of a subband measurement result corresponding to an even-numbered subband is higher than a priority of a subband measurement result corresponding to an odd-numbered subband.

TABLE 2

Priority 0:

Wideband measurement results corresponding to all reporting configurations (Part 2 wideband CSI for CSI reports 1 to $N_{Rep}$)
Priority 1:

Subband measurement result corresponding to an even-numbered subband in a wideband measurement result of a reporting configuration 1 (Part 2 subband CSI of even subbands for CSI report 1)
Priority 2:

Subband measurement result corresponding to an odd-numbered subband in the wideband measurement result of the reporting configuration 1 (Part 2 subband CSI of odd subbands for CSI report 1)
Priority 3:

Subband measurement result corresponding to an even-numbered subband in a wideband measurement result of a reporting configuration 2 (Part 2 subband CSI of even subbands for CSI report 2)
Priority 4:

Subband measurement result corresponding to an odd-numbered subband in the wideband measurement result of the reporting configuration 2 (Part 2 subband CSI of odd subbands for CSI report 2)

. . .

Priority $2N_{Rep} - 1$:

Subband measurement result corresponding to an even-numbered subband in a wideband measurement result of a reporting configuration $N_{Rep}$ (Part 2 subband CSI of even subbands for CSI report $N_{Rep}$)
Priority $2N_{Rep}$:

Subband measurement result corresponding to an odd-numbered subband in the wideband measurement result of the reporting configuration $N_{Rep}$ (Part 2 subband CSI of odd subbands for CSI report $N_{Rep}$)

In some embodiments, the plurality of PMIs reported in the joint measurement manner 2 may have different priorities. For example, the measurement resource is the channel resource, and priorities of PMIs corresponding to all resources may decrease sequentially or increase sequentially according to a sequence of channel resources for joint measurement (a sequence of resource indexes, a sequence of resource configurations, or a sequence of resources in a resource set). According to the foregoing manner, when uplink channel resources are insufficient, the terminal device may give up reporting reported content with a low priority based on priority sorting.

For example, a combination of the priority of the PMI and the priority of the subband may be but is not limited to the following two manners:

Manner 1: Priorities of the reported content may be first classified according to odd and even numbers corresponding to the subbands. For example, a priority of a subband measurement result corresponding to an even-numbered subband is higher than a priority of a subband measurement result corresponding to an odd-numbered subband, or a priority of a subband measurement result corresponding to an odd-numbered subband is higher than a priority of a subband measurement result corresponding to an even-numbered subband. Priorities are further classified based on PMIs. For example, the measurement resource is the channel resource. Priorities of PMIs corresponding to all resources may decrease sequentially according to a sequence of all channel resources for joint measurement (a sequence of resource indexes, a sequence of resource configurations, or a sequence of resources in a resource set). Alternatively, priorities of PMIs corresponding to all resources may increase sequentially according to a sequence of all channel resources for joint measurement (a sequence of resource indexes, a sequence of resource configurations, or a sequence of resources in a resource set).

For example, the measurement resource is the channel resource, the PMI quantity is 2, a priority of a subband measurement result corresponding to an even-numbered subband is higher than a priority of a subband measurement result corresponding to an odd-numbered subband, and priorities of PMIs corresponding to all resources decrease sequentially according to a sequence of all channel resources for joint measurement (a sequence of resource indexes, a sequence of resource configurations, or a sequence of resources in a resource set). For one reporting configuration, a priority of a PMI of an even-numbered subband may be higher than a priority of a PMI of an odd-numbered subband. Further, in reported content of an even-numbered subband or an odd-numbered subband, a priority of the first PMI is higher than a priority of the second PMI. For example, the priorities of the PMIs may be shown in Table 3.

TABLE 3

Priority 0:

PMIs corresponding to all reporting configurations (Wideband PMI for CSI reports 1 to $N_{Rep}$)
Priority 1:

First PMI of an even-numbered subband in a wideband measurement result of a reporting configuration 1
(First PMI of even subbands for CSI report 1)
Priority 2:

Second PMI of the even-numbered subband in the wideband measurement result of the reporting configuration 1
(Second PMI of even subbands for CSI report 1)
Priority 3:

First PMI of an odd-numbered subband in the wideband measurement result of the reporting configuration 1
(First PMI of odd subbands for CSI report 1)
Priority 4:

Second PMI of the odd-numbered subband in the wideband measurement result of the reporting configuration 1
(Second PMI of odd subbands for CSI report 1)

. . .

Manner 2: Priorities are first classified based on PMIs. For example, the measurement resource is the channel resource. Priorities of PMIs corresponding to all resources may decrease sequentially according to a sequence of all channel resources for joint measurement (a sequence of resource indexes, a sequence of resource configurations, or a sequence of resources in a resource set). Alternatively, priorities of PMIs corresponding to all resources may increase sequentially according to a sequence of all channel resources for joint measurement (a sequence of resource indexes, a sequence of resource configurations, or a sequence of resources in a resource set). Priorities may be further classified according to odd and even numbers corresponding to the subbands. For example, a priority of a subband measurement result corresponding to an even-numbered subband is higher than a priority of a subband measurement result corresponding to an odd-numbered subband, or a priority of a subband measurement result corresponding to an odd-numbered subband is higher than a priority of a subband measurement result corresponding to an even-numbered subband.

For example, the measurement resource is the channel resource, the PMI quantity is 2, a priority of a subband measurement result corresponding to an even-numbered subband is higher than a priority of a subband measurement result corresponding to an odd-numbered subband, and priorities of PMIs corresponding to all resources decrease sequentially according to a sequence of all channel resources for joint measurement (a sequence of resource indexes, a sequence of resource configurations, or a sequence of resources in a resource set). For one reporting configuration, a priority of the first PMI is higher than a priority of the second PMI. Further, for each PMI, a priority of a PMI of an even-numbered subband is higher than a priority of a PMI of an odd-numbered subband. For example, the priorities of the PMIs may be shown in Table 4.

TABLE 4

| |
| --- |
| Priority 0: |
| PMIs corresponding to all reporting configurations (Wideband PMI for CSI reports 1 to $N_{Rep}$) |
| Priority 1: |
| First PMI of an even-numbered subband in a wideband measurement result of a reporting configuration 1 (First PMI of even subbands for CSI report 1) |
| Priority 2: |
| First PMI of an odd-numbered subband in the wideband measurement result of the reporting configuration 1 (First PMI of odd subbands for CSI report 1) |
| Priority 3: |
| Second PMI of the even-numbered subband in the wideband measurement result of the reporting configuration 1 (Second PMI of even subbands for CSI report 1) |
| Priority 4: |
| Second PMI of the odd-numbered subband in the wideband measurement result of the reporting configuration 1 (Second PMI of odd subbands for CSI report 1) |
| . . . |

Embodiment 2

Figure 5:
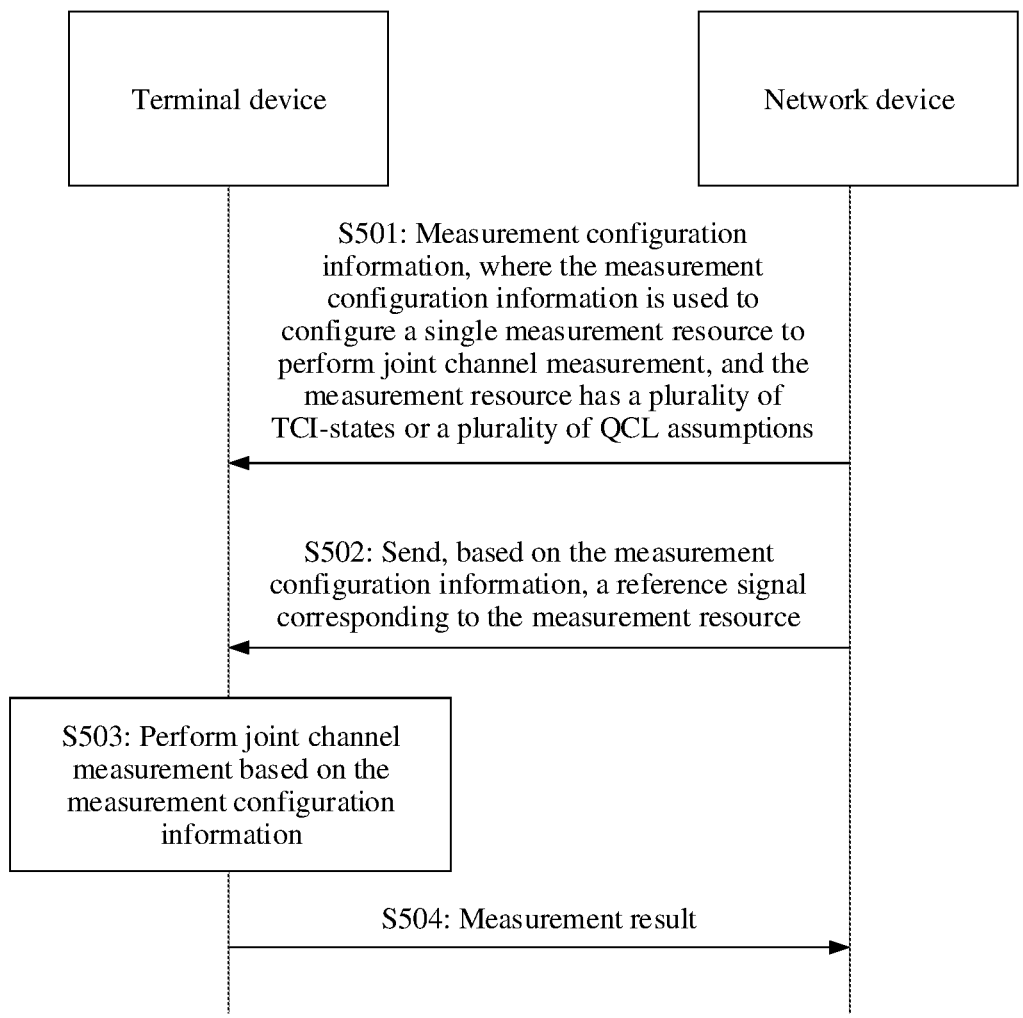
FIG. 5 is a schematic flowchart of a channel measurement method according to an embodiment of this application.

FIG. 5 shows another channel measurement method according to this application. The method may be applied to a communication device, a chip, a chip set, or the like. The following uses the communication device as an example for description. The method includes the following steps.

S501: A network device sends measurement configuration information to a terminal. Correspondingly, the terminal device receives the measurement configuration information from the network device. The measurement configuration information may be used to configure a single measurement resource to perform joint channel measurement, and the measurement resource has a plurality of TCI-states or a plurality of QCL assumptions.

For example, the measurement resource may have a plurality of TCI-states, and each TCI-state is associated with some ports (which may be one port or may be a plurality of ports) of the measurement resource. In this way, the terminal device knows beam information corresponding to each port, to measure a multi-TRP joint channel by using one CSI-RS.

For example, the associated port may be configured in the TCI-state.

Alternatively, a specific proportion may be configured, ports of the measurement resource are divided into a plurality of groups according to the proportion, and each group of ports is associated with one TCI-state. For example, the measurement resource has four TCI-states, and the measurement resource includes 12 ports. The 12 ports may be divided into four groups, where the four groups are one-to-one associated with the four TCI-states.

For example, the measurement resource may be a channel resource used to measure a channel, and the channel resource may also be referred to as a channel measurement resource. Alternatively, the measurement resource may be an interference resource used to measure interference, and the interference resource may also be referred to as an interference measurement resource. A type of the channel resource may be any one or a combination of an NZP CSI-RS resource, an SSB resource, a CSI-IM resource, and a ZP CSI-RS resource. A type of the interference resource may be any one or a combination of an NZP CSI-RS resource, an SSB resource, a CSI-IM resource, and a ZP CSI-RS resource.

In an example for description, the measurement configuration information may include a measurement configuration, and the measurement configuration includes related configuration information of the measurement resource. For example, the measurement configuration is used to configure a single measurement resource to perform joint channel measurement. For example, the measurement configuration may further include related parameters such as a sending periodicity, a time-frequency resource location, and a port quantity.

S502: The network device sends, based on the measurement configuration information, a reference signal corresponding to the measurement resource. One measurement resource may correspond to one reference signal.

S503: The terminal device performs joint channel measurement based on the measurement configuration information.

For step S503, refer to the foregoing step S403. Details are not repeated.

S504: The terminal device reports a measurement result to the network device.

For step S504, refer to the foregoing step S404. Details are not repeated.

Based on a same technical concept as the method embodiments, an embodiment of this application provides a communication apparatus. A structure of the communication apparatus may be shown in FIG. 6, and includes a processing module 6001 and a transceiver module 6002. The transceiver module 6002 may communicate with the outside, and the processing module 6001 is configured to perform processing, for example, perform measurement. The transceiver module 6002 may also be referred to as a communication interface, a transceiver unit, or a communication unit. The transceiver module 6002 may be configured to perform an action performed by the terminal device in the foregoing method embodiment, or the transceiver module 6002 may be configured to perform an action performed by the network device in the foregoing method embodiment.

For example, the transceiver module 6002 includes a sending module and/or a receiving module, respectively configured to perform the sending and receiving steps of the network device or the terminal device in the foregoing method embodiment.

In an implementation, the communication apparatus may be specifically configured to implement the method performed by the terminal device in Embodiment 1. The apparatus may be the terminal device, or may be a chip or a chip set in the terminal device, or a part of a chip that is configured to perform a related method function. The transceiver module 6002 is configured to perform receiving and sending-related operations on the terminal device side in the foregoing method embodiment, and the processing module 6001 is configured to perform processing-related operations of the terminal device in the foregoing method embodiment. For example, the transceiver module 6002 is configured to receive measurement configuration information from a network device, where the measurement configuration information is used to configure one or more groups of measurement resources, each group of measurement resources includes a plurality of measurement resources, and each group of measurement resources is used to perform joint channel measurement once; and the processing module 6001 is configured to perform joint channel measurement based on the measurement configuration information.

For example, for each group of measurement resources, the measurement configuration information further indicates that the measurement resources included in the group of measurement resources are used for joint channel measurement.

For example, when the measurement configuration information meets at least one of the following conditions, the measurement configuration information indicates that the measurement resources included in each group of measurement resources are used to perform joint channel measurement:

the measurement configuration information includes a first parameter, and the first parameter indicates that a channel measurement manner is joint channel measurement;

the measurement configuration information includes a second parameter, the second parameter indicates a quantity of measurement resources used for joint channel measurement, and a value of the second parameter is greater than 1;

the measurement resources included in each group of measurement resources are included in a plurality of resource sets; and the measurement configuration information includes reporting configuration information, and the reporting configuration information indicates that a codebook type for reporting a measurement result is a first codebook type.

Optionally, the processing module 6001 may be specifically configured to determine a plurality of precoding matrices based on the plurality of measurement resources included in each group of measurement resources, where the plurality of measurement resources are in one-to-one correspondence with the plurality of precoding matrices.

Alternatively, the processing module 6001 may be specifically configured to determine one precoding matrix based on the plurality of measurement resources included in each group of measurement resources.

In some embodiments, when determining the plurality of precoding matrices based on the plurality of measurement resources included in each group of measurement resources, the processing module 6001 may be specifically configured to: for each measurement resource in each group of measurement resources, determine a precoding matrix corresponding to the measurement resource, and when determining the precoding matrix corresponding to the measurement resource, use a measurement resource other than the measurement resource in the group of measurement resources as an interference resource.

For example, the measurement configuration information further indicates that a joint measurement manner is Manner 1 or Manner 2, Manner 1 is determining one precoding matrix based on the plurality of measurement resources included in each group of measurement resources, and Manner 2 is determining a plurality of precoding matrices based on the plurality of measurement resources included in each group of measurement resources.

For example, the plurality of precoding matrices have different priorities.

For example, the measurement configuration information further indicates that the codebook type is a second codebook type, and the second codebook type includes a parameter set corresponding to each measurement resource in each group of measurement resources, and a phase difference between any two measurement resources.

Optionally, the measurement resource is a channel resource, and the measurement configuration information is further used to configure an interference resource.

The interference resource includes one or more CSI-IM resources, one CSI-IM resource is associated with one group of measurement resources, and the CSI-IM resource has a same QCL relationship with the associated measurement resources.

Alternatively, the interference resource includes one or more NZP CSI-RS resources, one group of measurement resources is associated with at least one NZP CSI-RS resource, and the at least one NZP CSI-RS resource has a same QCL relationship with the associated measurement resources.

In another implementation, the communication apparatus may be specifically configured to implement the method performed by the network device in Embodiment 1. The apparatus may be the network device, or may be a chip or a chip set in the network device, or a part of a chip that is configured to perform a related method function. The transceiver module 6002 is configured to perform receiving and sending-related operations on the network device side in the foregoing method embodiment, and the processing module 6001 is configured to perform processing-related operations of the network device in the foregoing method embodiment. For example, the transceiver module 6002 is configured to communicate with a terminal device. The processing module 6001 is configured to: send measurement configuration information to the terminal device by using the transceiver module 6002, where the measurement configuration information is used to configure one or more groups of measurement resources, each group of measurement resources includes a plurality of measurement resources, and each group of measurement resources is used to perform joint channel measurement once; and send, based on the measurement configuration information by using the transceiver module 6002, reference signals corresponding to the one or more groups of measurement resources.

For example, for each group of measurement resources, the measurement configuration information further indicates that the measurement resources included in the group of measurement resources are used for joint channel measurement.

For example, when the measurement configuration information meets at least one of the following conditions, the measurement configuration information indicates that the measurement resources included in each group of measurement resources are used to perform joint channel measurement:

the measurement configuration information includes a first parameter, and the first parameter indicates that a channel measurement manner is joint channel measurement;

the measurement configuration information includes a second parameter, the second parameter indicates a quantity of measurement resources used for joint channel measurement, and a value of the second parameter is greater than 1;

the measurement resources included in each group of measurement resources are included in a plurality of resource sets; and the measurement configuration information includes reporting configuration information, and the reporting configuration information indicates that a codebook type for reporting a measurement result is a first codebook type.

The measurement configuration information may further indicate that a joint measurement manner is Manner 1 or Manner 2, Manner 1 is determining one precoding matrix based on the plurality of measurement resources included in each group of measurement resources, and Manner 2 is determining a plurality of precoding matrices based on the plurality of measurement resources included in each group of measurement resources, where the plurality of measurement resources are in one-to-one correspondence with the plurality of precoding matrices.

For example, the plurality of precoding matrices have different priorities.

The measurement configuration information may further indicate that the codebook type is a second codebook type, and the second codebook type includes a parameter set corresponding to each measurement resource in each group of measurement resources, and a phase difference between any two measurement resources.

Optionally, the measurement resource is a channel resource; and the measurement configuration information is further used to configure an interference resource, where the interference resource includes one or more CSI-IM resources, one CSI-IM resource is associated with one group of measurement resources, and the CSI-IM resource has a same QCL relationship with the associated measurement resources.

Alternatively, the interference resource includes one or more NZP CSI-RS resources, one group of measurement resources is associated with at least one NZP CSI-RS resource, and the at least one NZP CSI-RS resource has a same QCL relationship with the associated measurement resources.

In embodiments of this application, division of modules is an example, and is merely logical function division. In an actual implementation, there may be another division manner. In addition, function modules in embodiments of this application may be integrated into one processor, or each of the modules may exist alone physically, or two or more modules may be integrated into one module. The foregoing integrated module may be implemented in a form of hardware, or may be implemented in a form of a software function module. It may be understood that for functions or implementations of the modules in embodiments of this application, further refer to related descriptions in the method embodiments.

Figure 7:
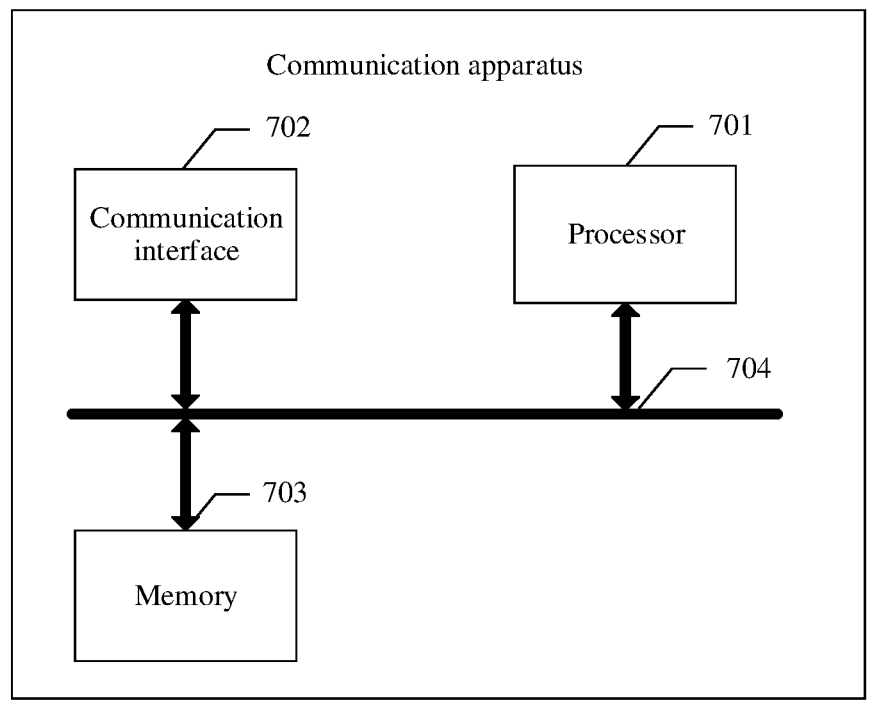
FIG. 7 is a schematic diagram of a structure of a communication apparatus according to an embodiment of this application.

In a possible manner, the communication apparatus may be shown in FIG. 7. The communication apparatus may be a communication device or a chip in the communication device. The communication device may be a terminal device, or may be a network device. The apparatus may include a processor 701, a communication interface 702, and a memory 703. The processing module 6001 may be the processor 701. The transceiver module 6002 may be the communication interface 702. It should be further understood that the transceiver module 6002 may also be an input/output interface. In addition, a function of the transceiver module 6002 may be implemented by a transceiver. The transceiver may include a transmitter and/or a receiver, to separately implement functions of the sending unit and the receiving unit.

In the input/output interface, the input corresponds to the receiving or obtaining operation, and the output corresponds to the sending operation.

The processor 701 may be a central processing unit (CPU), a digital processing module, or the like. The communication interface 702 may be a transceiver, an interface circuit such as a transceiver circuit, a transceiver chip, or the like. The apparatus further includes a memory 703, configured to store a program executed by the processor 701. The memory 703 may be a nonvolatile memory, for example, a hard disk drive (HDD) or a solid-state drive (SSD), or may be a volatile memory, for example, a random-access memory (RAM). The memory 703 is any other medium that can be configured to carry or store expected program encode that has a form of an instruction or a data structure and that can be accessed by a computer, but is not limited thereto.

The processor 701 is configured to execute the program code stored in the memory 703, and is specifically configured to perform an action of the processing module 6001. Details are not described herein again in this application. The communication interface 702 is specifically configured to perform an action of the transceiver module 6002. Details are not described in this application again.

The communication interface 702, the processor 701, and the memory 703 may communicate with each other through an internal connection path, to transfer a control and/or data signal. The memory 703 is configured to store a computer program, and the processor 701 is configured to invoke the computer program from the memory 703 and run the computer program, to control the communication interface 702 to receive and send a signal. Optionally, the communication apparatus may further include an antenna, configured to send, by using a radio signal, data, control signaling, information, or a message output by the communication interface 702.

The processor 701 and the memory 703 may be integrated into one processing apparatus. The processor 701 is configured to execute program code stored in the memory 703 to implement the foregoing functions. During specific implementation, the memory 703 may also be integrated into the processor 701, or may be independent of the processor 701. The processor 701 may correspond to the processing module in FIG. 6.

Figure 6:
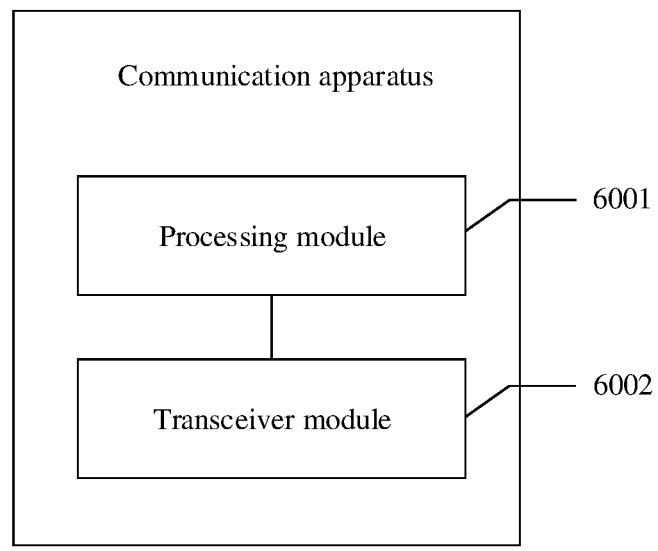
FIG. 6 is a schematic diagram of a structure of a communication apparatus according to an embodiment of this application.

The communication interface 702 may correspond to the transceiver module in FIG. 6, and may also be referred to as a transceiver unit or a transceiver. The communication interface 702 may include a receiver (or referred to as a receiver circuit) and a transmitter (or referred to as a transmitter circuit). The receiver is configured to receive a signal, and the transmitter is configured to transmit a signal.

This embodiment of this application does not limit a specific connection medium between the communication interface 702, the processor 701, and the memory 703. In this embodiment of this application, the memory 703, the processor 701, and the communication interface 702 are connected to each other by using a bus 704 in FIG. 7. The bus is represented by using a thick line in FIG. 7, and a connection manner between other components is merely described as an example, and is not limited thereto. The bus may be classified into an address bus, a data bus, a control bus, and the like. For ease of representation, only one thick line is used to represent the bus in FIG. 7, but this does not mean that there is only one bus or only one type of bus.

An embodiment of this application further provides a processing apparatus, including a processor and an interface. The processor may be configured to perform the method in the foregoing method embodiments.

It should be understood that, the processing apparatus may be a chip. For example, the processing apparatus may be a field programmable gate array (FPGA), an application-specific integrated circuit (ASIC), a system on chip (SoC), a CPU, a network processor (NP), a digital signal processor (DSP), a micro controller unit (MCU), a programmable logic device (PLD), or another integrated chip.

For example, the interface may be an interface circuit. For example, the interface circuit may be a code/data read/write interface circuit. The interface circuit may be configured to receive code instructions (where the code instructions are stored in a memory and may be directly read from the memory, or may be read from the memory by using another component) and transmit the code instructions to the processor. The processor may be configured to run the code instructions to perform the method in the foregoing method embodiment.

For another example, the interface circuit may alternatively be a signal transmission interface circuit between the communication processor and the transceiver. For example, in a sending scenario, the processor is configured to perform XX to obtain Y data (where XX is a non-air interface operation, and includes but is not limited to operations such as determining, decision, processing, calculation, searching, and comparison). The interface circuit may be configured to send the Y data to the transmitter (where the transmitter is configured to perform a sending operation on an air interface). For another example, in a receiving scenario, the interface circuit may be configured to receive Z data from the receiver (where the receiver is configured to perform a receiving operation on an air interface), and send the Z data to the processor. The processor is configured to perform XX processing on the Z data (where XX is a non-air interface operation, and includes but is not limited to operations such as determining, decision, processing, calculation, searching, and comparison).

For example, based on the foregoing method embodiment, the interface circuit may be configured to receive measurement configuration information from the receiver, and the processor is configured to perform joint channel measurement based on the measurement configuration information.

An embodiment of the present invention further provides a computer-readable storage medium, configured to store computer software instructions that need to be executed for execution of the foregoing processor, and the computer-readable storage medium includes a program that needs to be executed for execution of the foregoing processor.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

The computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The computer program instructions may be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover the modifications and variations of this application provided that they fall within the scope of the following claims and equivalent technologies of this application.

What is claimed is:

1. A method, comprising:
receiving measurement configuration information from a network device, wherein the measurement configuration information is used to configure one or more measurement resource groups, each measurement resource group of the one or more measurement resource groups comprises X measurement resources, X is an integer greater than 1, and wherein the X measurement resources are channel measurement resources;
performing joint channel measurement based on the measurement configuration information; and
sending a measurement result of the joint channel measurement to the network device, wherein the measurement result comprises X precoding matrix indicators (PMIs), X rank indicators (RIs), and one joint channel quality indicator (CQI) corresponding to one measurement resource group of the one or more measurement resource groups, wherein:
the measurement configuration information is further used to configure one or more interference resources, and wherein the one or more interference resources comprise one or more channel state information interference measurement (CSI-IM) resources, each one CSI-IM resource is associated with one measurement resource group, and each one CSI-IM resource has a same quasi-collocation (QCL) relationship with X measurement resources of the associated measurement resource group.

2. The method according to claim 1, wherein the measurement configuration information indicates to use the X measurement resources comprised in each measurement resource group for joint channel measurement.

3. The method according to claim 1, wherein performing joint channel measurement based on the measurement configuration information comprises:
determining a plurality of precoding matrices based on the X measurement resources comprised in each measurement resource group, wherein the X measurement resources comprised in each measurement resource group are in one-to-one correspondence with the plurality of precoding matrices.

4. The method according to claim 1, wherein the measurement configuration information indicates that a joint measurement manner is a second manner, and the second manner is determining a plurality of precoding matrices based on the X measurement resources comprised in each measurement resource group.

5. The method according to claim 1, wherein performing joint channel measurement based on the measurement configuration information comprises:
when measuring any resource in each measurement resource group, using another measurement resource as an interference measurement resource.

6. A method, comprising:
sending measurement configuration information to a terminal device, wherein the measurement configuration information is used to configure one or more measurement resource groups, each measurement resource group comprises X measurement resources, X is an integer greater than 1, and wherein the X measurement resources are channel measurement resources;
sending a reference signal according to the measurement configuration information; and
receiving a measurement result reported by the terminal device, wherein the measurement result comprises X precoding matrix indicators (PMIs), X rank indicators (RIs), and one joint channel quality indicator (CQI) corresponding to one measurement resource group of the one or more measurement resource groups, wherein:
the measurement configuration information is further used to configure one or more interference resources, and wherein the one or more interference resources comprise one or more channel state information interference measurement (CSI-IM) resources, each one CSI-IM resource is associated with one measurement resource group, and each one CSI-IM resource has a same quasi-collocation (QCL) relationship with X measurement resources of the associated measurement resource group.

7. The method according to claim 6, wherein the measurement configuration information indicates to use the X measurement resources comprised in each measurement resource group for joint channel measurement.

8. The method according to claim 6, wherein the measurement configuration information indicates that a joint measurement manner is a second manner, and the second manner is determining a plurality of precoding matrices based on the X measurement resources comprised in each measurement resource group.

9. A apparatus, comprising:
a transceiver, configured to receive measurement configuration information from a network device, wherein the measurement configuration information is used to configure one or more measurement resource groups, each measurement resource group of the one or more measurement resource groups comprises X measurement resources, X is an integer greater than 1, and wherein the X measurement resources are channel measurement resources; and
at least one processor, configured to perform joint channel measurement based on the measurement configuration information; and
wherein the transceiver is further configured to send a measurement result of the joint channel measurement to the network device, wherein the measurement result comprises X precoding matrix indicators (PMIs), X rank indicators (RIs), and one joint channel quality indicator (CQI) corresponding to one measurement resource group of the one or more measurement resource groups, wherein:
the measurement configuration information is further used to configure one or more interference resources, and wherein the one or more interference resources comprise one or more channel state information interference measurement (CSI-IM) resources, each one CSI-IM resource is associated with one measurement resource group, and each one CSI-IM resource has a same quasi-collocation (QCL) relationship with X measurement resources of the associated measurement resource group.

10. The apparatus according to claim 9, wherein the measurement configuration information indicates to use the X measurement resources comprised in each measurement resource group for joint channel measurement.

11. The apparatus according to claim 9, wherein the at least one processor is configured to:
determine a plurality of precoding matrices based on the X measurement resources comprised in each measurement resource group, wherein the X measurement resources comprised in each measurement resource group are in one-to-one correspondence with the plurality of precoding matrices.

12. The apparatus according to claim 9, wherein the measurement configuration information indicates that a joint measurement manner is a second manner, and the second manner is determining a plurality of precoding matrices based on the X measurement resources comprised in each measurement resource group.

13. The apparatus according to claim 9, wherein the at least one processor is configured to:
when measuring any resource in each measurement resource group, use another measurement resource as an interference measurement resource.

14. A apparatus, comprising:
a transmitter, configured to:
send measurement configuration information to a terminal device, wherein the measurement configuration information is used to configure one or more measurement resource groups, each measurement resource group comprises X measurement resources, X is an integer greater than 1, and wherein the X measurement resources are channel measurement resources; and
send a reference signal according to the measurement configuration information; and
a receiver, configured to receive a measurement result reported by the terminal device, wherein the measurement result comprises X precoding matrix indicators (PMIs), X rank indicators (RIs), and one joint channel quality indicator (CQI) corresponding to one measurement resource group of the one or more measurement resource groups, wherein:
the measurement configuration information is further used to configure one or more interference resources, and wherein the one or more interference resources comprise one or more channel state information interference measurement (CSI-IM) resources, each one CSI-IM resource is associated with one measurement resource group, and each one CSI-IM resource has a same quasi-collocation (QCL) relationship with X measurement resources of the associated measurement resource group.

15. The apparatus according to claim 14, wherein the measurement configuration information indicates to use the X measurement resources comprised in each measurement resource group for joint channel measurement.

16. The apparatus according to claim 14, wherein the measurement configuration information indicates that a joint measurement manner is a second manner, and the second manner is determining a plurality of precoding matrices based on the X measurement resources comprised in each measurement resource group.

17. The method according to claim 1, wherein performing joint channel measurement based on the measurement configuration information comprises:
determining one precoding matrix based on the X measurement resources comprised in each measurement resource group.

18. The method according to claim 6, wherein the measurement configuration information indicates that a joint measurement manner is a first manner, and the first manner is determining one precoding matrix based on the X measurement resources comprised in each measurement resource group.

19. The apparatus according to claim 9, wherein the at least one processor is configured to:
determine one precoding matrix based on the X measurement resources comprised in each measurement resource group.

20. The apparatus according to claim 14, wherein the measurement configuration information indicates that a joint measurement manner is a first manner, and the first manner is determining one precoding matrix based on the X measurement resources comprised in each measurement resource group.

* * * * *